(12) United States Patent
Layson, Jr.

(10) Patent No.: US 8,606,865 B2
(45) Date of Patent: *Dec. 10, 2013

(54) LOCATION DERIVED MESSAGING SYSTEM

(76) Inventor: Hoyt M. Layson, Jr., Orlando, FL (US)

( * ) Notice: Subject to any disclaimer, the term of this patent is extended or adjusted under 35 U.S.C. 154(b) by 140 days.

This patent is subject to a terminal disclaimer.

(21) Appl. No.: 13/019,512

(22) Filed: Feb. 2, 2011

(65) Prior Publication Data

US 2011/0191432 A1    Aug. 4, 2011

Related U.S. Application Data

(60) Provisional application No. 61/300,912, filed on Feb. 3, 2010.

(51) Int. Cl.
*G06F 15/16* (2006.01)
*G06F 15/173* (2006.01)

(52) U.S. Cl.
USPC ............... 709/206; 709/207; 709/240

(58) Field of Classification Search
None
See application file for complete search history.

(56) References Cited

U.S. PATENT DOCUMENTS

| | | | |
|---|---|---|---|
| 5,848,397 A | 12/1998 | Marsh et al. | |
| 6,009,409 A | 12/1999 | Adler et al. | |
| 6,031,454 A | 2/2000 | Lovejoy et al. | |
| 6,060,993 A * | 5/2000 | Cohen | 340/691.6 |
| 6,286,029 B1 | 9/2001 | Delph | |
| 7,228,341 B2 | 6/2007 | Giacalone, Jr. | |
| 7,454,290 B2 | 11/2008 | Alban et al. | |
| 7,639,881 B2 | 12/2009 | Viola et al. | |
| 2001/0003846 A1 | 6/2001 | Rowe et al. | |
| 2002/0087401 A1 | 7/2002 | Leapman et al. | |
| 2002/0087525 A1* | 7/2002 | Abbott et al. | 707/3 |
| 2002/0112026 A1 | 8/2002 | Fridman et al. | |
| 2002/0120518 A1 | 8/2002 | Carney et al. | |
| 2002/0178445 A1 | 11/2002 | Eldering et al. | |
| 2002/0194914 A1 | 12/2002 | Foxlin et al. | |
| 2003/0055725 A1 | 3/2003 | Lee | |
| 2003/0080999 A1 | 5/2003 | Stone et al. | |
| 2003/0229900 A1 | 12/2003 | Reisman | |
| 2008/0144264 A1 | 6/2008 | Cosgrove | |
| 2008/0147410 A1 | 6/2008 | Odinak | |
| 2008/0262928 A1 | 10/2008 | Michaelis | |
| 2009/0012873 A1 | 1/2009 | Hamling et al. | |
| 2009/0146919 A1 | 6/2009 | Kline et al. | |
| 2009/0197616 A1 | 8/2009 | Lewis et al. | |
| 2009/0234861 A1 | 9/2009 | Ramer et al. | |
| 2009/0299857 A1* | 12/2009 | Brubaker | 705/14.66 |
| 2009/0326851 A1 | 12/2009 | Tanenhaus | |
| 2010/0194857 A1* | 8/2010 | Mentz et al. | 348/43 |
| 2010/0259673 A1* | 10/2010 | Russell | 348/383 |
| 2010/0332304 A1* | 12/2010 | Higgins et al. | 705/14.16 |

OTHER PUBLICATIONS

WIPO, Written Opinion of WIPO Application PCT/US2011/023450, Mar. 28, 2011, pp. 1-11.*
WIPO, International Search Report of WIPO Application PCT/US2011/023450, Mar. 28, 2011, pp. 1-2.*

* cited by examiner

*Primary Examiner* — Kenny Lin
*Assistant Examiner* — Joe Combs

(57) ABSTRACT

The invention disclosed relates to the end to end system, the methods and apparatuses for delivering message content from publishers to recipients, such recipients being comprised of subscribers and non subscribers, based on the geospatial location of the recipients using a plurality of devices, stationary and mobile, to deliver geospatial location relevant message content to the recipients with dynamic display devices and a means to provide publishers with data and statistics related to recipient observation of message content.

82 Claims, 74 Drawing Sheets

Mobile Dynamic Display Device On Bus

FIG. 19(a)

| Table 1 ||
|---|---|
| Video File Formats File Description | Popularity |
| 3GPP2 Multimedia File | Very Common |
| 3GPP Multimedia File | Very Common |
| 3GPP Multimedia File | Average |
| 3GPP Media File | Average |
| 3D Movie Maker Movie Project | Average |
| CCTV Video Clip | Uncommon |
| After Effects Project | Average |
| CCTV Video File | Average |
| Anime Music Video File | Average |
| Adobe Motion Exchange File | Average |
| WebEx Advanced Recording File | Average |
| Advanced Systems Format File | Very Common |
| Microsoft ASF Redirector File | Very Common |
| Avid Bin File | Average |
| Audio Video Interleave File | Very Common |
| AviSynth Script File | Average |
| Application Visualization System File | Average |
| AXMEDIS Object | Average |
| BINK Video File | Average |

FIG. 19(b)

| Table 1 ||
|---|---|
| Video File Formats File Description | Popularity |
| Binary Video File | Average |
| Kodicom Video File | Average |
| Kodicom Video | Average |
| Blu-ray AVC Video File | Average |
| Brigham Young University Movie | Average |
| Camtasia Studio Screen Recording | Average |
| cVideo | Average |
| DVD2AVI File | Average |
| Datel Video File | Average |
| VCD Video File | Average |
| DVR365 Video File | Uncommon |
| DriveCam Video | Average |
| Digital Interface Format | Uncommon |
| Adobe Director Movie | Average |
| DivX-Encoded Movie File | Common |
| Digital Multimedia Broadcasting File | Average |
| Nintendo DS Movie File | Average |
| Besta Video File | Rare |
| Digital Video File | Average |
| Microsoft Digital Video Recording | Common |
| DivX Video File | Average |
| Protected Macromedia Director Movie | Average |

FIG. 19(c)

| Table 1 | |
|---|---|
| Video File Formats File Description | Popularity |
| HD DVD Video File | Average |
| Eyemail Video Recording File | Average |
| Flash MP4 Video File | Common |
| FlashBack Screen Recording | Common |
| FlashBack Screen Recorder Movie | Average |
| Final Cut Project | Average |
| FLIC Animation | Average |
| FLIC Animation File | Average |
| FLIC Animation | Average |
| Flash Video File | Very Common |
| FLIC Animation | Average |
| GRASP Animation | Average |
| GRASP Animation | Average |
| Google Video File | Rare |
| Google Video Pointer | Uncommon |
| QuickTime HD Movie File | Common |
| Havok Movie File | Average |
| DVD-Video Disc Information File | Average |
| iMovie Project File | Average |
| iMovie Project | Average |
| Surveillance Video File | Uncommon |
| Indeo Video Format File | Average |

FIG. 19(d)

| Table 1 | |
|---|---|
| Video File Formats File Description | Popularity |
| Internet Video Recording | Average |
| Internet Streaming Video | Average |
| Isadora Media Control Project | Average |
| Isadora Project | Average |
| Streaming Media Format | Average |
| Streaming Media Shortcut | Uncommon |
| iFinish Video Clip | Average |
| MPEG-1 Video File | Uncommon |
| MPEG-21 File | Average |
| AXMEDIS MPEG-21 File | Average |
| MPEG-1 Layer 2 Audio File | Uncommon |
| HDV Video File | Average |
| Blu-ray BDAV Video File | Average |
| MPEG-2 Video | Average |
| MPEG-4 Video File | Rare |
| MPEG-4 Playlist | Average |
| iTunes Video File | Common |
| RealPlayer Metafile | Uncommon |
| PSP Video File | Average |
| Motion JPEG 2000 Video Clip | Average |
| MJPEG Video File | Average |
| Motion JPEG Video File | Uncommon |

FIG. 19(e)

| Table 1 | |
|---|---|
| Video File Formats File Description | Popularity |
| Matroska Video File | Common |
| PlayStation Movie File | Average |
| JVC Recorded Video File | Rare |
| Sony Video Analysis File | Uncommon |
| MOI Video File | Average |
| Apple QuickTime Movie | Average |
| Apple QuickTime Movie | Very Common |
| QuickTime Movie File | Uncommon |
| MPEG-21 Multimedia File | Average |
| AXMEDIS MPEG-21 Object | Average |
| MPEG-2 Video File | Uncommon |
| MPEG-4 Video File | Very Common |
| MPEG-4 Video | Uncommon |
| MPEG Movie File | Uncommon |
| MPEG Movie | Common |
| MainActor Project File | Rare |
| MPEG Video File | Very Common |
| MPEG-2 Video File | Rare |
| MPEG-2 Video Stream | Rare |
| Sony Movie Format File | Average |
| Windows DVD Maker Project File | Average |
| Visual Communicator Project File | Average |

FIG. 19(f)

| Table 1 | |
|---|---|
| Video File Formats File Description | Popularity |
| Windows Movie Maker Project | Average |
| AVCHD Video File | Common |
| MTV Video Format File | Average |
| Multimedia Viewer Book Source File | Average |
| Movie Collector Catalog | Average |
| Movie Edit Pro Video Project | Average |
| Material Exchange Format File | Common |
| Nullsoft Streaming Video File | Average |
| NeroVision Express Project File | Average |
| Ogg Media File | Common |
| Ogg Vorbis Video File | Average |
| Dedicated Micros DVR Recording | Average |
| PowerDirector Project File | Average |
| Pivot Stickfigure Animation | Average |
| CyberLink PowerDVD Playlist | Average |
| PSP Movie File | Average |
| Premiere Elements Project File | Average |
| ProPresenter Export File | Average |
| Premiere Pro Project | Average |
| PVA Video File | Uncommon |
| Pixbend Media File | Average |
| Apple QuickTime Movie | Common |

FIG. 19(g)

| Table 1 | |
|---|---|
| Video File Formats File Description | Popularity |
| QuickTime Cache File | Average |
| QuickTime Link File | Average |
| Quartz Composer File | Average |
| iMovie '08 Project | Common |
| Wavelet Video Images File | Average |
| Topfield PVR Recording | Average |
| Real Media File | Very Common |
| RealMedia Variable Bit Rate File | Common |
| Id Software Game Video | Average |
| RealPix Clip | Average |
| RealPlayer Streaming Media | Average |
| QuickTime Real-Time Streaming Format | Average |
| Bink Video Subtitle File | Average |
| Real Video File | Average |
| SWiSH Project Backup File | Average |
| SBT Subtitle File | Uncommon |
| ScreenCam Screen Recording | Common |
| Super Chain Media File | Rare |
| Pinnacle Studio Scene File | Average |
| Sonic Foundry Video Capture File | Average |
| SMIL Presentation | Average |
| SMIL Presentation File | Common |

FIG. 19(h)

| Table 1 | |
|---|---|
| Video File Formats File Description | Popularity |
| Smacker Compressed Movie File | Average |
| VideoLink Mail Video File | Uncommon |
| FutureSplash Animation | Average |
| SubRip Subtitle File | Common |
| Standard Streaming Metafile | Average |
| PlayStation Video Stream | Uncommon |
| Pinnacle Studio Project File | Common |
| Samsung Video File | Average |
| Flash Movie | Very Common |
| SWiSH Project File | Average |
| Flash Generator Template | Average |
| DivX Author Template File | Average |
| TiVo Video File | Average |
| JVC Everio Video Capture File | Average |
| Beyond TV Transport Stream File | Average |
| TMPGEnc Project File | Average |
| HD Video Transport Stream | Average |
| Video Transport Stream File | Common |
| VC-1 Video File | Average |
| VDOLive Media File | Average |
| Vegas Video Project | Average |
| Meta Media Video E-Mail File | Uncommon |

FIG. 19(i)

| Table 1 | |
| --- | --- |
| Video File Formats File Description | Popularity |
| Vegas Movie Studio Project File | Average |
| Video for Windows | Uncommon |
| DigitalVDO Compressed Video File | Average |
| Generic Video File | Average |
| Qarbon Viewlet | Average |
| VivoActive Video File | Average |
| VivoActive Video File | Average |
| VisionLab Studio Project File | Average |
| DVD Video Object File | Very Common |
| TrueMotion VP6 Video File | Average |
| TrueMotion VP7 Video File | Average |
| DVD Video Recording Format | Common |
| WinCAPs Subtitle File | Average |
| WinDVD Creator Project File | Average |
| Windows Media File | Average |
| Windows Media Download Package | Average |
| Windows Movie Maker Project File | Average |
| Windows Media Video File | Very Common |
| Windows Media Redirector | Average |
| Windows Media Video Redirector | Average |
| Xvid-Encoded Video File | Common |
| YUV Video File | Average |

FIG.19(j)

| Table 1 | |
|---|---|
| Video File Formats File Description | Popularity |
| ZSNES Movie #1 File | Average |
| ZSNES Movie #2 File | Average |
| ZSNES Movie #3 File | Average |
| ZSNES Movie File | Average |

FIG. 20(a)

| Table 2 | |
|---|---|
| Audio File Formats File Description | Popularity |
| 4-MP3 Database File | Average |
| UNIS Composer 669 Module | Average |
| Six Channel Module | Average |
| Eight Channel Module | Average |
| Amiga OctaMed Music File | Average |
| Amiga 8-Bit Sound File | Average |
| AdLib Tracker 2 File | Average |
| Audible Audio Book File | Average |
| ATRAC Audio File | Common |
| Advanced Audio Coding File | Very Common |
| Audible Enhanced Audiobook File | Average |
| ABC Music Notation | Average |
| Music Album | Average |
| Audio Codec 3 File | Average |
| ACID Project File | Average |
| ADPCM Compressed Audio File | Average |
| Ableton Device Group | Average |
| WinAHX Tracker Module | Average |
| Audio Interchange File Format | Very Common |
| Compressed Audio Interchange File | Average |

FIG. 20(b)

| Table 2 | |
|---|---|
| Audio File Formats File Description | Popularity |
| Audio Interchange File Format | Average |
| Velvet Studio Instrument | Average |
| Akai Sampler File | Average |
| A-Law Compressed Sound Format | Average |
| A-Law Compressed Sound Format | Average |
| Cubasis Project File | Average |
| Advanced Module File | Average |
| Adaptive Multi-Rate Codec File | Average |
| Extreme Tracker Module | Average |
| Velvet Studio Module | Average |
| DVD-Audio Audio Object File | Average |
| Monkey's Audio Lossless Audio File | Average |
| Velvet Studio Sample | Average |
| Sony ATRAC Audio File | Rare |
| Audio File | Average |
| Video Game Compressed Audio File | Average |
| Audacity Project File | Average |
| Audio Visual Research File | Average |
| AMR-WB Audio File | Uncommon |
| GarageBand Project File | Average |
| Blaze Audio Wave Information File | Average |
| CARA Sound Radiation Data File | Average |

FIG. 20(c)

| Table 2 | |
|---|---|
| Audio File Formats File Description | Popularity |
| CARA Loudspeaker Design File | Average |
| Cakewalk Bundle File | Average |
| Broadcast Wave File | Average |
| Typhoon Wave Audio File | Average |
| Core Audio File | Common |
| CD Audio Track Shortcut | Average |
| Raw Audio CD Data | Average |
| Audition Loop | Average |
| iTunes CD Information File | Average |
| Creative Music Format | Uncommon |
| Sony Ericsson Protected Content File | Average |
| Cubase Project | Common |
| Cubase Waveform File | Average |
| Cakewalk SONAR Project | Average |
| OPL2 FM Audio File | Average |
| OPL2 FM Audio File | Average |
| DRM Content Format File | Average |
| DCM Audio Module | Average |
| Dictation Audio File | Average |
| SoundEdit Recorded Instrument | Average |
| Defractor 2 Instrument | Average |
| Defractor Instrument | Average |

FIG. 20(d)

| Table 2 | |
|---|---|
| Audio File Formats File Description | Popularity |
| Digilink Audio File | Average |
| Sound Designer Audio File | Average |
| Downloadable Sounds File | Average |
| DRM Delivery Message | Average |
| Delusion Digital Music File | Average |
| Delusion Digital Sound File | Average |
| Digital Sound Module | Average |
| Dynamic Studio Professional Module | Average |
| Digital Speech Standard File | Average |
| DigiTrakker Module | Average |
| DTS Encoded Audio File | Average |
| Sony Digital Voice File | Average |
| DiamondWare Digital Audio File | Average |
| Eyemail Audio Recording | Average |
| Ensoniq ASR File | Average |
| Ensoniq EPS File | Average |
| Ensoniq KT File | Average |
| Ensoniq SQ1/SQ2/KS-32 File | Average |
| Ensoniq SQ-80 File | Average |
| Ensoniq VFX-SD File | Average |
| ABT Extended Module | Average |
| ESPS Sampled Data File | Average |

FIG. 20(e)

| Table 2 | |
|---|---|
| Audio File Formats File Description | Popularity |
| Farandoyle Linear Module File | Average |
| Raw 32-Bit Audio File | Average |
| Farandoyle Blocked Module File | Average |
| Raw 64-Bit Audio File | Average |
| Farandole Composer Module | Average |
| Gravis UltraSound Sound Bank | Average |
| Free Lossless Audio Codec File | Common |
| FruityLoops Project | Average |
| Flash Lite Sound Bundle | Uncommon |
| Farandole Composer WaveSample File | Average |
| Casio FZ-1 Bank Dump | Average |
| Casio FZ-1 Full Dump | Average |
| Casio FZ-1 Voice Dump | Average |
| G.721 Audio File | Average |
| G.723 Audio File | Average |
| G.726 Audio File | Average |
| Tascam GigaSampler File | Average |
| Guitar Pro 5 Tablature File | Average |
| WaveLab Audio Peak File | Average |
| Global System for Mobile Audio File | Average |
| US Robotics GSM Audio File | Average |
| IC Recorder Sound File | Average |

FIG. 20(f)

| Table 2 | |
|---|---|
| Audio File Formats File Description | Popularity |
| Interchange File Format | Very Common |
| Ensoniq Instrument | Average |
| Sample Cell II Instrument Definition File | Average |
| Impulse Tracker Module | Uncommon |
| Impulse Tracker Instrument | Average |
| Impulse Tracker Sample | Average |
| JAM Musical Score | Average |
| Kurzweil K2500 File | Average |
| Kurzweil K2600 File | Average |
| Karaoke MIDI File | Average |
| Kinetic Music Project | Average |
| Battery Drum Kit File | Uncommon |
| Korg Trinity/Triton Keymap File | Uncommon |
| Audiokoz Music File | Average |
| Bell Music File | Average |
| Kurzweil K2000 File | Average |
| Korg Trinity/Triton Script File | Uncommon |
| Korg Trinity/Triton Sample File | Average |
| Battery 2 Drum Kit File | Uncommon |
| Battery 3 Drum Kit File | Average |
| Kinetic Project Template | Average |
| Left Audio Channel File | Average |

FIG. 20(g)

| Table 2 | |
|---|---|
| Audio File Formats File Description | Popularity |
| Lossless Audio File | Average |
| Liquid Audio File | Uncommon |
| Logic Audio Project | Average |
| Avaya Voice Player Audio File | Uncommon |
| Linguistically Enhanced Sound File | Average |
| MPEG-1 Audio File | Uncommon |
| Media Playlist File | Very Common |
| Apple Lossless Audio File | Common |
| MPEG-4 Audio Book File | Common |
| iTunes Music Store Audio File | Average |
| iPhone Ringtone File | Common |
| Monarch Audio File | Average |
| DigiTrakker Module | Average |
| Amiga MED Sound File | Average |
| Yamaha MegaVoice File | Average |
| MIDI File | Very Common |
| MIDI File | Very Common |
| Nintendo 64 Song File | Average |
| Matroska Audio File | Average |
| Meridian Lossless Packing Audio File | Uncommon |
| Synthetic Music Mobile Application File | Average |
| MO3 Audio File | Average |

FIG 20(h)

| Table 2 | |
|---|---|
| Audio File Formats File Description | Popularity |
| Amiga Music Module File | Common |
| MPEG-1 Layer 1 Audio File | Uncommon |
| MPEG Layer II Compressed Audio File | Average |
| MP3 Audio File | Very Common |
| MPEG-2 Audio File | Very Common |
| Musepack Compressed Audio File | Average |
| File List Creator Playlist | Average |
| MPEG-1 Layer 3 Audio File | Average |
| MPEG Layer 3 Audio File | Average |
| Mobile Phone Sound File | Average |
| Memory Stick Voice File | Uncommon |
| MadTracker 2 Module | Uncommon |
| MadTracker 2 Envelope | Average |
| MadTracker Instrument | Average |
| MultiTracker Module | Average |
| MadTracker 2 Pattern | Average |
| MadTracker 2 Sample File | Average |
| Finale Notation File Format | Average |
| MWave DSP Synth Instrument Extract | Rare |
| Mozart Percussion File | Uncommon |
| Napster Secured Music File | Average |
| KONTAKT Instrument File | Average |

FIG. 20(i)

| Table 2 | |
|---|---|
| Audio File Formats File Description | Popularity |
| Nero Audio Compilation | Average |
| Nokia Ringtone | Average |
| Nullsoft Streaming Audio File | Average |
| NES Sound Format File | Average |
| NoiseTracker Module | Average |
| NOTION Song File | Average |
| NoteWorthy Composer File | Average |
| OverDrive Media File | Average |
| Ogg Vorbis Audio File | Average |
| Ogg Vorbis Compressed Audio File | Common |
| Oktalyzer Module | Average |
| Sony OpenMG Music File | Average |
| Open Media Framework File | Average |
| OpenMG Audio File | Average |
| OtsAV Media Library Information File | Average |
| OtsAV Album File | Average |
| Overture Musical Score | Average |
| SBStudio II Song File | Average |
| Gravis UltraSound GF1 Patch File | Average |
| Pinnacle Sample Bank | Average |
| Perfect Clarity Audio | Average |
| Korg Instrument Bank File | Average |

FIG. 20(j)

| Table 2 | |
| --- | --- |
| Audio File Formats File Description | Popularity |
| Pulse Code Modulation | Average |
| Steinberg Peak File | Average |
| PhyMod Physical Modeling Data | Average |
| Audition Peak File | Average |
| Sansa Playlist File | Average |
| Audio Playlist | Average |
| PhatNoise Audio File | Average |
| WAVmaker Program File | Average |
| Akai MPC2000 Program File | Average |
| Portable Sound File | Average |
| Protracker Studio Module | Average |
| Pro Tools 7 Session File | Common |
| PolyTracker Module | Average |
| Pro Tools Session | Average |
| Panasonic VM1 Voice File | Average |
| PureVoice Audio File | Average |
| Right Audio Channel File | Average |
| RealOne Streaming Media File | Average |
| Real Audio File | Very Common |
| Real Audio Media | Common |
| Raw Audio Data | Average |
| Rebirth Song File | Average |

FIG. 20(k)

| Table 2 | |
|---|---|
| Audio File Formats File Description | Popularity |
| ReCycle Loop File | Average |
| Reason ReFill Sound Bank | Average |
| Rich Music Format | Average |
| RMID MIDI File | Average |
| Real Media Jukebox Audio File | Average |
| RAM Meta File | Uncommon |
| RealJukebox Format | Average |
| Nokia Composer Ringtone | Average |
| Reason Song File | Common |
| Ad Lib Synthesized Instrument | Average |
| Reason Project File | Average |
| NXT Brick Audio File | Average |
| Real Tracker Instrument | Average |
| Real Tracker Module | Average |
| Real Tracker Sample | Average |
| Scream Tracker 3 Instrument | Average |
| ScreamTracker 3 Module | Uncommon |
| Secure Audio File | Average |
| MOD Edit Sample File | Average |
| Signed Byte Audio File | Rare |
| Sound Blaster Instrument | Average |
| E-MU SoundFont Sound Bank | Uncommon |

FIG. 20(1)

| Table 2 | |
|---|---|
| Audio File Formats File Description | Popularity |
| Sample Cell II Instrument Definition | Average |
| Sound Designer Audio File | Average |
| ESPS Sampled Data File | Average |
| Sound Designer II File | Average |
| MIDI Sample Dump Standard File | Average |
| Sample MIDI Dump Exchange | Average |
| Audition Session | Average |
| IRCAM Sound File | Average |
| SoundFont 2 Sound Bank | Average |
| Sound Forge Audio Peak File | Average |
| Sound Forge Sound Data File | Average |
| Shorten Compressed Audio File | Average |
| Sibelius Score | Common |
| Commodore 64 Music File | Average |
| SID Audio File | Average |
| Standard MIDI File | Average |
| SampleVision Audio Sample Format | Average |
| Sound File | Common |
| Macintosh Sound Resource | Average |
| Akai MPC Sample | Uncommon |
| MIDI Song File | Average |
| SBStudio II Sound File | Average |

FIG. 20(m)

| Table 2 | |
| --- | --- |
| Audio File Formats File Description | Popularity |
| SPPack Sound Sample | Average |
| Synclavier Program File | Average |
| Synclavier Sequence File | Average |
| Synclavier Sound File | Average |
| Scream Tracker 2 Module | Average |
| Scream Tracker Music Interface Kit File | Average |
| Yamaha/Korg Keyboard Style | Uncommon |
| 8SVX Sound File | Average |
| Signed Word Audio File | Average |
| ShockWave Audio | Average |
| Synchomatic Instrument | Average |
| Yamaha SY99/SY85 Audio File | Average |
| MIDI System Exclusive Message | Average |
| Akai Teledisk Sound Library | Average |
| Final Music System Tracker Module | Average |
| Amiga THX Tracker Music File | Average |
| PSP Audio File | Average |
| TrueSpeech Audio File | Average |
| Yamaha TX16W Audio File | Average |
| AU Audio File | Average |
| Unsigned Byte Audio File | Uncommon |
| Raw u-Law Audio File | Uncommon |

FIG. 20(n)

| Table 2 | |
|---|---|
| Audio File Formats File Description | Popularity |
| UltraTracker Module | Average |
| u-Law Audio File | Rare |
| MikMod UniMOD Module | Average |
| Nintendo 64 Music File | Average |
| Nintendo 64 Song Library | Average |
| Unsigned Word Audio File | Average |
| UltraTracker Wave File | Average |
| PlayStation Compressed Sound File | Average |
| Olympus Voice Recording | Rare |
| VSampler Soundbank File | Average |
| Covox Raw Sample | Average |
| Vocaltec Media File | Average |
| Covox Speech Thing Sample | Average |
| Creative Labs Audio File | Average |
| Voyetra Voice File | Average |
| VoxWare Dialogic Audio File | Average |
| Karaoke Player Playlist | Average |
| TwinVQ Audio File | Average |
| Ventrilo Audio Recording | Average |
| Samsung Digital Voice Recorder File | Average |
| Yamaha SY Series Wave File | Average |
| WAVE Audio File | Very Common |

FIG. 20(O)

| Table 2 | |
|---|---|
| Audio File Formats File Description | Popularity |
| WAVE Sound File | Average |
| Windows Media Audio Redirect | Average |
| WaveFront Sound Bank | Average |
| WaveFront Drum Kit File | Average |
| WaveFront Program File | Average |
| Windows Media Audio File | Very Common |
| Grave Composer Music Module | Average |
| Nero Wave Editor File | Average |
| Wwise Project | Average |
| Cakewalk Music Project | Average |
| WUTG Tagged Audio File | Average |
| WUTG Tag File | Average |
| WavPack Audio File | Average |
| WavPack Correction File | Average |
| Wwise Work Unit | Average |
| eRacer Sound File | Average |
| Fasttracker 2 Extended Instrument File | Average |
| Fasttracker 2 Extended Module | Average |
| Extensible Music File | Average |
| Extended MIDI File | Average |
| Fastracker 2 Pattern | Average |
| Renoise Song File | Average |

FIG. 20(p)

| Table 2 | |
|---|---|
| Audio File Formats File Description | Popularity |
| XACT Sound Bank | Uncommon |
| XSPF Playlist File | Average |
| Fastracker 2 Track | Average |
| XACT Wave Bank | Uncommon |
| ZyXEL Voice File | Average |
| SAFA Media Audio File | Uncommon |

FIG. 21(a)

| Table 3 | |
|---|---|
| Graphic File Formats File Description | Popularity |
| Pocket PC Bitmap Image File | Average |
| VersaCAD 2D Drawing | Average |
| Stereo CAD-3D Image File | Uncommon |
| Stereo CAD-3D 2.0 Image File | Uncommon |
| Stereo CAD-3D 2.0 Image File | Uncommon |
| 3D Assembly | Average |
| 3D Format | Average |
| LightConverse 3D Model File | Average |
| Rhino 3D Model | Very Common |
| QuickDraw 3D Metafile | Common |
| 3D Studio Scene | Average |
| 3D VRML World | Average |
| Rhino 3D Model File | Average |
| Adobe Photoshop Macintosh File | Average |
| Photo Album | Common |
| ArtCut 5 Document | Average |
| ArtCut 6 Document | Average |
| American College of Radiology Format | Average |
| Genesis3D Actor File | Average |

FIG. 21(b)

| Table 3 | |
|---|---|
| Graphic File Formats File Description | Popularity |
| Scanstudio 16 Color Image | Average |
| AutoCAD Device-Independent Binary Plotter File | Average |
| Advanced Function Presentation File | Average |
| Active GIF Creator Project | Average |
| ArtGem Project File | Average |
| Adobe Illustrator File | Very Common |
| Advanced Image Coding File | Uncommon |
| ACDSee Image Sequence | Average |
| Sony Photo Album | Average |
| Anim8or File | Average |
| 3D Animation File | Average |
| Animated Portable Network Graphic | Average |
| ArtiosCAD Workspace File | Average |
| Amber Graphic File | Average |
| AOL Compressed Image File | Average |
| Art Document | Common |
| Assemble SAT 3D Model File | Average |
| FaxView Document | Uncommon |
| Artweaver Document | Average |
| Business Card Designer Pro File | Average |
| Business Card Designer Plus File | Average |

FIG. 21(c)

| Table 3 | |
| --- | --- |
| Graphic File Formats File Description | Popularity |
| Character Studio Biped File | Average |
| Broderbund Business Card File | Average |
| Blender 3D Data File | Common |
| Block Artist Image File | Average |
| Compressed Bitmap Graphic | Average |
| Embroidery Image File | Average |
| Bitmap Cache File | Average |
| Binary Material File | Average |
| FloorPlan File | Average |
| Bitmap Image File | Very Common |
| Bryce 3 Scene File | Average |
| Bryce 4 Scene File | Average |
| Bryce 3D Scene File | Common |
| CreataCard Brochure Project | Average |
| Broadleaf Tree Model | Average |
| BarTender Label | Average |
| Biovision Hierarchy Animation File | Average |
| JEDMICS Image File | Uncommon |
| Cinema 4D Model File | Average |
| BobCAD-CAM File | Average |
| Clip Art Gallery | Average |

FIG. 21(d)

| Table 3 | |
| --- | --- |
| Graphic File Formats File Description | Popularity |
| Calendar File | Average |
| CALS Raster Graphic | Average |
| CALS Raster Graphic File | Average |
| Casio Digital Camera Picture | Rare |
| Canon Navigator Fax Document | Average |
| CATIA V5 Part Document | Average |
| Click'N Design 3d File | Average |
| Chasys Draw Image File | Average |
| CorelDRAW Image File | Common |
| CorelDraw Template | Average |
| Computer Eyes Image | Average |
| MicroStation Cell Library | Average |
| Computer Graphics Metafile | Average |
| ClipArt Gallery Packaged File | Average |
| Kodak Cineon Bitmap File | Average |
| Intergraph Bitmap Image File | Average |
| Canon CD Label Template | Average |
| Poser Camera Set File | Average |
| Solid Edge Wire Harness File | Average |
| Generic CADD Component File | Average |
| Corel Metafile Exchange Image File | Average |
| Compressed Poser Camera Set File | Average |

FIG. 21(e)

| Table 3 | |
| --- | --- |
| Graphic File Formats File Description | Popularity |
| Canvas 6-8 Drawing File | Uncommon |
| Comic Life Document | Average |
| CPC Compressed Image File | Average |
| Compressed PhotoDefiner Image File | Uncommon |
| Manga Studio Page File | Average |
| Corel Print House File | Average |
| Corel Photo House File | Average |
| Corel Photo-Paint Document | Common |
| Canon Raw Image File | Common |
| Poser Character Rigging File | Average |
| Canon Raw CIFF Image File | Uncommon |
| Compressed Poser Character Rigging File | Average |
| Compact Shared Document | Average |
| Content Secure Format | Average |
| Character Studio Marker File | Average |
| Scitex Continuous Tone File | Uncommon |
| Dr. Halo Bitmap Image File | Average |
| Canvas 5 Drawing File | Average |
| Calamus Vector Graphic File | Average |
| Canvas Image Format | Average |
| CassiniVision Map Image File | Uncommon |
| Canvas 4 Drawing File | Average |

FIG. 21(f)

| Table 3 | |
| --- | --- |
| Graphic File Formats File Description | Popularity |
| Canvas 9 Image File | Uncommon |
| Digital Asset Exchange File | Average |
| DesignCAD Design File | Average |
| DesignCAD Drawing | Average |
| DICOM Image File | Common |
| Kodak RAW Image File | Average |
| Desktop Color Separation File | Average |
| FAXserve Fax Document | Average |
| Device Dependent Bitmap | Rare |
| ClarisDraw Drawing | Average |
| DirectDraw Surface | Uncommon |
| Pro/DESKTOP CAD File | Average |
| Corel Designer File | Average |
| Microsoft Expression Design Drawing | Average |
| RenderWare Model File | Average |
| Drafix CAD File | Average |
| MicroStation Design File | Common |
| Device Independent Bitmap File | Common |
| DjVu Image | Average |
| Digital Negative Image File | Common |
| Ovation Pro File | Average |
| DrawPlus Drawing File | Average |

FIG. 21(g)

| Table 3 | |
|---|---|
| Graphic File Formats File Description | Popularity |
| Digital InterPlot File | Average |
| Digital Picture Exchange File | Average |
| Drawing File | Very Common |
| DESIGNER Drawing | Average |
| SolidWorks Drawing Template | Average |
| Publish-iT Document | Average |
| Desktop Wallpaper | Average |
| Virtual Library File | Average |
| Design Web Format File | Average |
| Design Web Format XPS File | Average |
| AutoCAD Drawing Database File | Very Common |
| Drawing Exchange Binary | Average |
| Drawing Exchange Format File | Very Common |
| SolidWorks eDrawings File | Common |
| Panda3D Model File | Average |
| Enhanced Windows Metafile | Common |
| Windows Compressed Enhanced Metafile | Common |
| Copysafe Protected PDF File | Average |
| Encapsulated PostScript File | Very Common |
| Exchangeable Image Information File | Common |

FIG. 21(h)

| Table 3 | |
| --- | --- |
| Graphic File Formats File Description | Popularity |
| FACE Graphic | Average |
| FACE Graphic | Average |
| Bitmap Graphic Header Information | Rare |
| Fax Document | Average |
| Fuzzy Bitmap | Rare |
| Autodesk FBX Interchange File | Average |
| Poser Face Pose File | Average |
| FastCAD DOS Drawing | Average |
| FastCAD Windows Drawing | Average |
| Compressed Poser Face Pose File | Average |
| PictureMate Borders File | Average |
| Adobe Freehand 7 File | Uncommon |
| FreeHand 9 Drawing File | Average |
| FreeHand Drawing File | Average |
| Xfig Drawing | Average |
| Symbian Application Logo File | Uncommon |
| Flexible Image Transport System | Average |
| FelixCAD Drawing | Average |
| FrameMaker Document | Average |
| FloorPlan 3D Design File | Average |
| IKEA Home Planner File | Common |
| FlashPix Bitmap Image File | Average |

FIG. 21(i)

| Table 3 | |
|---|---|
| Graphic File Formats File Description | Popularity |
| FlexiSIGN Document | Average |
| Flash XML Graphics File | Common |
| BRL-CAD Geometry File | Average |
| Generic CADD Drawing File | Average |
| Graphic Design System | Average |
| Ventura Publisher Document | Average |
| GEM Metafile | Uncommon |
| VRML Geography File | Uncommon |
| GIFBlast Compressed Image File | Rare |
| Graphical Interchange Format File | Very Common |
| Graphics Kernel System | Average |
| Geology Multi-File | Average |
| Graphic PhotoDefiner Image File | Uncommon |
| OmniGraffle Drawing | Average |
| Granny 3D File | Average |
| Graphic Object Bitmap | Uncommon |
| Graphic Object Bitmap File | Rare |
| Grayscale Image | Average |
| Graphtec Vector Graphics File | Average |
| Graphic Description Language File | Average |
| General CADD Pro Component | Average |

FIG. 21(j)

| Table 3 | |
|---|---|
| Graphic File Formats File Description | Popularity |
| General CADD Pro Drawing | Average |
| Half-Fold Card File | Uncommon |
| ChartXL Chart | Average |
| Poser Hand Pose File | Average |
| HD Photo File | Common |
| High Dynamic Range Image File | Average |
| Compressed Poser Hand Pose File | Average |
| HF Image | Average |
| Houdini Project File | Average |
| Houdini Apprentice File | Average |
| Hallmark Card Studio File | Average |
| HP Graphics Language Plotter File | Average |
| Hemera Photo Objects Image File | Average |
| HP-GL Plotter File | Average |
| TRS-80 Graphic | Average |
| Poser Hair File | Average |
| Hitachi Raster Format | Average |
| Compressed Poser Hair File | Average |
| HyperMaker Publication | Average |
| Inventor Assembly File | Average |
| Low Resolution Imagic Graphic | Average |
| Medium Resolution Imagic Graphic | Average |

FIG. 21(k)

| Table 3 ||
|---|---|
| Graphic File Formats File Description | Popularity |
| High Resolution Imagic Graphic | Average |
| Image Object Content Architecture (IOCA) File | Average |
| Targa ICB Bitmap Image | Average |
| Windows Icon File | Average |
| Icon Image File | Uncommon |
| IronCAD 3D Drawing File | Average |
| Inventor Drawing | Average |
| Amiga IFF Graphic | Average |
| IGES File | Average |
| IGES Drawing File | Average |
| Deluxe Paint Graphic | Average |
| QuickSilver Document | Uncommon |
| JFIF Bitmap Image | Rare |
| InDesign Document | Average |
| Adobe InDesign File | Very Common |
| InDesign Template | Average |
| ZoomBrowser Image Index File | Average |
| Pantone Reference File | Average |
| Pocket PC Handwritten Note | Rare |
| SGI Integer Image | Average |
| InDesign Interchange File | Common |

FIG. 21(1)

| Table 3 | |
| --- | --- |
| Graphic File Formats File Description | Popularity |
| Inventor Part File | Average |
| iPod Photo Thumbnails | Average |
| Image World | Average |
| JPEG Image | Average |
| JPEG 2000 Code Stream | Average |
| JPEG 2000 Image | Uncommon |
| Paint Shop Pro Compressed Graphic | Average |
| Paint Shop Pro Browser Cache | Average |
| Joint Bi-level Image Group File | Average |
| Paint Shop Pro Brushes File | Average |
| JPEG File Interchange | Average |
| JPEG File Interchange Format | Uncommon |
| Digital Photo Navigator Album | Average |
| JPEG Image File | Uncommon |
| JPEG Image File Format | Rare |
| JPEG Network Graphic | Average |
| JPEG 2000 Core Image File | Average |
| JPEG 2000 Code Stream File | Average |
| Joint PhotoDefiner Image | Uncommon |
| JPEG Image | Average |
| JPEG Image File | Common |
| JPEG 2000 Image | Uncommon |

FIG. 21(m)

| Table 3 | |
|---|---|
| Graphic File Formats File Description | Popularity |
| JPEG Image File | Very Common |
| World File for JPEG | Average |
| JPEG 2000 Image File | Common |
| JT Open CAD File | Average |
| JPEG Tagged Interchange Format | Average |
| Kodak Photo-Enhancer File | Average |
| Kodak Proprietary Decimated TIFF File | Rare |
| Kofax Image File | Average |
| Kodak Compressed Image File | Uncommon |
| 20-20 Design File | Average |
| Kinemac Animation File | Average |
| Kinemac Sprite Object | Average |
| Kodak Photo CD File | Average |
| Kai's Power Goo Graphic | Uncommon |
| WordPerfect Label Definition File | Average |
| Deluxe Paint Bitmap Image | Average |
| AutoCAD Linetype File | Average |
| 3D Landscape File | Common |
| Poser Light Set File | Average |
| Compressed Poser Light Set File | Average |
| LightWave 3D Object File | Average |

FIG. 21(n)

| Table 3 | |
|---|---|
| Graphic File Formats File Description | Popularity |
| LightWave 3D Scene File | Average |
| LEGO Digital Designer Model File | Average |
| 3D Model File | Uncommon |
| Maya Project File | Common |
| MacPaint Image | Average |
| Access Diagram | Average |
| PaperPort Scanned Document | Common |
| OmniPage Scanned Document | Average |
| 3ds Max Scene File | Average |
| Maya Binary Project File | Common |
| ManaBook Book Kit File | Uncommon |
| Multi Bitmap File | Average |
| Poser 5 Material File | Average |
| Poser 6 Material File | Average |
| Mathcad Image | Average |
| MICRO CADAM-X/6000 Model Data File | Average |
| Compressed Poser Material File | Average |
| Microsoft Document Imaging File | Common |
| PRO100 3D Interior Catalog Element | Average |
| 3D Mesh Model | Average |
| MediaFace Online Saved File | Average |
| MediaFACE Project File | Average |

FIG. 21(o)

| Table 3 | |
|---|---|
| Graphic File Formats File Description | Popularity |
| MediaFACE Project Template | Average |
| Materials and Geometry Format | Average |
| MGCSoft Vector Shapes | Average |
| Image Composer File | Average |
| Multiple Image Print File | Average |
| Picture It! Image File | Uncommon |
| PhotoDraw Image File | Average |
| Master Album Maker Digital Photo Album | Average |
| Multiple Network Graphic | Common |
| Character Studio Marker Name File | Average |
| CATIA 3D Model FIle | Average |
| Maya PLE Project File | Average |
| Microsoft Media Package FIle | Average |
| Multiple Resolution Bitmap | Average |
| Minolta Raw Image File | Average |
| MilkShape 3D Model | Average |
| Paint Shop Pro Mask | Average |
| Microsoft Paint Bitmap Image | Average |
| MetaStream Scene File | Average |
| Compressed MetaStream Scene File | Average |
| MSN Application Extension | Average |
| Nero Cover Designer Document | Average |

FIG. 21(p)

| Table 3 | |
|---|---|
| Graphic File Formats File Description | Popularity |
| Nikon Electronic Format RAW Image File | Uncommon |
| NeoChrome Bitmap Image | Average |
| Neutral File Format | Average |
| Gamebryo Image | Average |
| Nikon Raw Image File | Average |
| Nikon Capture Custom Curves | Average |
| MediaFace II CD Label | Average |
| 3D Object File | Common |
| OpenDocument Chart | Average |
| OpenDocument Graphic | Average |
| OpenDocument Image | Average |
| Open Document Interchange Format | Average |
| Object File Format | Average |
| Online Access File | Average |
| OMF Interchange Image File | Average |
| OmniPage Document | Average |
| FlipAlbum File | Average |
| Olympus RAW File | Average |
| OTA Bitmap | Average |
| Nokia Over The Air Bitmap | Average |
| OpenDocument Chart Template | Average |
| OpenDocument Graphic Template | Average |

FIG. 21(q)

| Table 3 | |
|---|---|
| Graphic File Formats File Description | Popularity |
| OpenDocument Image Template | Average |
| Cubase WAVE File Overview | Average |
| Express STEP Data Model File | Average |
| Compressed Poser Pose File | Average |
| Peak3D 3D Graphics File | Average |
| PageMaker 6.5 Document | Average |
| Print Artist Project | Average |
| STAD Graphic File | Average |
| Dr. Halo Color Palette | Average |
| PanoramaStudio Project File | Average |
| Pattern File | Average |
| 3D Patch File | Average |
| Portable Bitmap Image | Average |
| Degas Elite Low Res Image File | Average |
| Degas Elite Medium Res Image File | Average |
| Degas Elite High Res Image File | Average |
| PowerCADD 6 Drawing File | Average |
| PowerCADD 7 Drawing File | Average |
| Kodak Photo CD Image File | Average |
| Picture File | Very Common |
| Paintbrush Bitmap Image File | Average |

FIG. 21(r)

| Table 3 | |
|---|---|
| Graphic File Formats File Description | Popularity |
| FlexiSIGN 5 Plotter Document | Average |
| Adobe PhotoDeluxe Image | Average |
| Portable Document Format File | Very Common |
| Print Designer GOLD File | Average |
| Paint.NET Image File | Average |
| Photo Explorer Thumbnail Archive | Average |
| PhotoImpact Image Archive | Average |
| Pentax Electronic File | Average |
| PDFill Project File | Average |
| Paint Shop Pro Picture Frame | Average |
| Portable Gray Map Image | Average |
| Degas Low Resolution Image File | Average |
| Degas Medium Resolution Image File | Average |
| Portrait Innovations Photo | Average |
| Degas High Resolution Image File | Average |
| DEGAS Image | Average |
| DEGAS Image | Average |
| DEGAS Image | Average |
| Generic Picture File | Average |
| QuickTime PICT Image | Average |
| Houdini Raster Image | Average |

FIG. 21(s)

| Table 3 ||
|---|---|
| Graphic File Formats File Description | Popularity |
| Houdini 3D Compositing Image | Average |
| Picture File | Average |
| Picture Clipping | Average |
| BRL-CAD Raw Image File | Average |
| Unix Color Plot File | Average |
| 3D Home Architect Foundation Floor Plan | Average |
| 3D Home Architect Floor Plan | Average |
| 3D Home Architect Second Level Floor Plan | Average |
| ArchiCAD Project Archive | Average |
| ArchiCAD Project File | Very Common |
| AutoCAD Plotter Document | Average |
| HPGL Plot File | Average |
| Polygon Model File | Average |
| Unix XV Graphic File | Average |
| PageMaker 3 Document | Average |
| PageMaker 4 Document | Average |
| PageMaker 5.0 Document | Uncommon |
| PageMaker 6.0 Document | Average |
| Portable Network Graphic | Very Common |
| Popnoggin Image File | Uncommon |
| MacPaint File | Average |

FIG. 21(t)

| Table 3 | |
| --- | --- |
| Graphic File Formats File Description | Popularity |
| POV-Ray Raytracing Format | Average |
| Prolab Object File | Average |
| Poser Prop File | Average |
| Portable Pixmap Image File | Common |
| Page Plus Publication | Average |
| PagePlus Template File | Average |
| Compressed Poser Prop File | Average |
| Printable File | Average |
| Solid Edge Part File | Average |
| Unigraphics Part File | Average |
| Artlantis Shader Preview File | Average |
| PostScript File | Very Common |
| Photoshop Large Document Format | Average |
| Photoshop Document | Very Common |
| PhotoStudio File | Average |
| Page Segment File | Average |
| PostScript Image Data File | Uncommon |
| Solid Edge Sheet Metal File | Average |
| Paint Shop Pro Image File | Very Common |
| Paint Shop Pro Image | Average |

FIG. 21(u)

| Table 3 | |
|---|---|
| Graphic File Formats File Description | Popularity |
| ArtRage Project File | Average |
| Pentax RAW Image File | Average |
| Paint Shop Pro Texture File | Average |
| PhotoWorks Image File | Uncommon |
| Print Workshop Image | Average |
| Pixel Image File | Average |
| Pixelmator Image File | Average |
| Pixar Image File | Average |
| Poser Pose File | Average |
| Poser Scene File | Average |
| Compressed Poser Scene File | Average |
| Label Matrix Label Design | Average |
| QuickTime Image File | Average |
| QuickTime Image File | Average |
| QuickTime Image File | Average |
| QuarkXPress Document | Very Common |
| QuarkXPress Project File | Very Common |
| QuarkXPress Template | Average |
| Fuji RAW Image File | Average |
| Sun Raster Graphic | Average |
| Raw Image Data File | Average |

FIG. 21(v)

| Table 3 | |
|---|---|
| Graphic File Formats File Description | Popularity |
| Rayshade Image | Average |
| MicroStation Redline File | Average |
| Ray Dream Studio Scene File | Average |
| Revit Family Template File | Uncommon |
| RGB Bitmap | Average |
| Q0 Image File | Average |
| NXT Image File | Uncommon |
| Raster Image File | Average |
| ColorRIX Bitmap Graphic | Average |
| Run Length Encoded Bitmap | Average |
| Poser Model Preview File | Average |
| Saracen Paint Graphic | Average |
| ACIS SAT Model File | Average |
| Scrapbook Factory File | Average |
| ColorRIX Bitmap Graphic | Average |
| ColorRIX Bitmap Graphic | Average |
| ColorRIX Bitmap Graphic | Average |
| Scitex Continuous Tone File | Average |
| ColorRIX Bitmap Graphic | Average |
| ScanVec CASmate Sign File | Average |
| OpenOffice.org Draw Document | Average |
| SAP2000 Model File | Common |

FIG. 21(w)

| Table 3 | |
|---|---|
| Graphic File Formats File Description | Popularity |
| Spatial Data Modeling Language File | Average |
| SmartDraw Drawing | Average |
| SmartDraw Template File | Average |
| Structured Fax Format | Average |
| Seattle FilmWorks Image | Uncommon |
| Silicon Graphics Image File | Average |
| Sweet Home 3D Design File | Average |
| Sweet Home 3D Model Library | Average |
| Segmented Hyper-Graphic | Uncommon |
| Shapes File | Common |
| Softimage Image Format | Average |
| MrSID Image | Average |
| Broderbund Sign File | Average |
| Aurora Image | Average |
| ChemSketch Drawing | Average |
| Maya Skeleton File | Average |
| SketchUp Document | Average |
| SolidWorks Assembly File | Average |
| SolidWorks Sheet File | Average |
| SolidWorks Drawing File | Average |
| SolidWorks Part File | Average |
| Xionics SMP Image Format | Average |

FIG. 21(x)

| Table 3 | |
|---|---|
| Graphic File Formats File Description | Popularity |
| Access Report Snapshot | Average |
| SignPlot Traffic Sign File | Average |
| Spectrum 512 Compressed Image | Average |
| WinSpec CCD Capture File | Average |
| Still Picture Interchange File Format | Average |
| PhotoPlus Picture File | Average |
| SpeedTree Tree Data File | Average |
| Spectrum 512 Image | Average |
| Sun Raster Image File | Average |
| Sony Raw Image File | Average |
| StarOffice Drawing Template | Average |
| STEP 3D Model | Average |
| Stereolithography File | Common |
| PRO100 3D Interior Design Project | Average |
| STEP 3D CAD File | Common |
| Sun Raster Graphic | Average |
| Sun TAAC Graphic | Average |
| Subtitle Bitmap File | Average |
| Scalable Vector Graphics File | Very Common |
| Compressed SVG File | Common |
| StarOffice Drawing | Average |

FIG. 21(y)

| Table 3 | |
|---|---|
| Graphic File Formats File Description | Popularity |
| Sun TAAC Graphic | Average |
| Technobox CAD Drawing | Average |
| TurboCAD Drawing Template | Average |
| TurboCAD Drawing File | Average |
| TurboCAD 3D Model Text File | Average |
| 3D Data Description | Average |
| Texture File | Common |
| World File for TIFF | Average |
| Tiled Group 4 Raster Image File | Average |
| Targa Graphic | Common |
| Thumbnail Image File | Very Common |
| Video Thumbnail File | Average |
| JAlbum Thumbnail File | Average |
| Tagged Image File | Very Common |
| Tagged Image File Format | Average |
| Tiled JPEG File | Average |
| The Logo Creator File | Average |
| Tiny Image (Low Resolution) | Average |
| Tiny Image (Medium Resolution) | Average |
| Tiny Image (High Resolution) | Average |
| Atari Tiny Image | Average |

FIG. 21(z)

| Table 3 | |
| --- | --- |
| Graphic File Formats File Description | Popularity |
| Tiled Raster Interchange Format | Average |
| Subsampled Raw YUV Image | Average |
| Universal 3D File | Average |
| Ulead File Object | Average |
| Utah Raster Toolkit File | Average |
| Subsampled Raw YUV Image | Average |
| Visual3D.NET Data File | Average |
| Targa Bitmap Image File | Uncommon |
| Sun TAAC Graphic File | Average |
| VICAR Image | Average |
| Visualization Image File Format | Average |
| JVC JLIP Image | Average |
| Type3 Design File | Uncommon |
| VRML Virtual World | Rare |
| Visio Drawing File | Average |
| Visio Stencil File | Average |
| Targa Bitmap Image | Uncommon |
| Visio Drawing Template | Average |
| 3DESIGN CAD File | Average |
| Anim8or 3D Model | Average |
| Vue Scene File | Average |
| Vivid 3D Scanner Element File | Average |

FIG. 21(aa)

| Table 3 | |
|---|---|
| Graphic File Formats File Description | Popularity |
| VectorWorks 2008 Design File | Average |
| Wireless Bitmap Image File | Average |
| Windows Media Photo File | Uncommon |
| Xara Web Format | Uncommon |
| Walk-Graph Segment | Average |
| Wavelet Image | Average |
| J Wavelet Image | Average |
| Windows Metafile | Average |
| Windows Media Photo File | Average |
| Wink Screen Capture | Average |
| WordPerfect Graphic File | Average |
| VRML World | Average |
| Geomagic 3D Wrap File | Average |
| VRML World | Average |
| Xara3D Project | Average |
| Xara Xtreme Drawing | Average |
| X11 Bitmap Graphic | Average |
| GIMP Image File | Common |
| Fuji Xerox DocuWorks File | Average |
| ScanSoft Pagis File | Average |
| Reality Lab 3D Image File | Average |
| X11 Pixmap Graphic | Average |

FIG. 21(bb)

| Table 3 | |
|---|---|
| Graphic File Formats File Description | Popularity |
| XML Paper Specification File | Common |
| Softimage XSI 3D Image | Average |
| X Windows Dump | Average |
| Xara Webstyle Graphic | Average |
| Parasolid Model Part File | Average |
| Parasolid Model Part File | Average |
| Subsampled Raw YUV Image | Average |
| Arts & Letters Clipart Library | Uncommon |
| Powerflip 3D Image File | Average |
| Powerflip YAODL 3D Image File | Average |
| YUV Encoded Image File | Average |
| Avery DesignPro Label File | Average |
| Avery DesignPro Label File | Average |
| Zenographics Image File | Average |
| Zooming Image Format File | Average |
| Zinio Electronic Magazine File | Average |
| Mental Ray Image Depth File | Average |

FIG. 22

| Table 4 Types of Markup Languages ||
|---|---|
| Name | Definition |
| HTML | Hyper Text Markup Language |
| SGML | Standard Generalized Markup Language |
| XML | eXtensible Markup Language |
| XHTML | eXtensible Hyper Text Markup Language |
| WML | Wireless Markup Language |
| MHTML | Mobile Hyper Text Markup Language |
| HDML | Handheld Device Markup Language |
| VML | Vector Markup Language |

LOCATION DERIVED MESSAGING SYSTEM

CROSS REFERENCE TO RELATED APPLICATIONS

This application claims priority to co pending Provisional Patent Application Ser. No. 61/300,912 filed on Feb. 3, 2010 and entitled "Location Derived Messaging." The contents of this co-pending are fully incorporated herein for all purposes.

TECHNICAL FIELD

This disclosure relates to wired and wireless communications, geospatial location technology, indoor and outdoor electronic dynamic display technology, portable wireless display devices and the Internet. More specifically this disclosure relates to: (1) a central system for the collection of publisher's message content to be sent to a subscriber recipient's portable wireless display devices and electronic display devices, indoor and outdoor, stationary fixed position and mobile; (2) a central system for the collection of subscriber recipients requesting specific message content be delivered to their portable wireless display device based on the subscriber's geospatial location, date interval and time interval; (3) a subscriber recipient's portable wireless display device capable of determining a publisher's message content being observed by the subscriber recipient; (4) a central system for providing the publisher recipient observation data and statistics; (5) publisher's specifying the display of their message content based on the static or dynamic geospatial location of either/or/and; a) the subscriber recipient's portable wireless display device, b) the static geospatial location of a dynamic display device indoor or outdoor, and c) the dynamic geospatial location of a dynamic display device indoor or outdoor. This end to end system between recipients, both subscribers and non subscribers, and publishers utilizes heretofore unavailable methods, apparatuses and enabling technologies combined in this invention.

BACKGROUND OF THE INVENTION

Recipients of publisher message content are inundated with publisher message content from a number of means. The postal service delivers bulk mail at a discount postage rate to allow advertisers, both local and nationwide, to send publisher message content to recipients for their products and services. Radio and television delivers publisher message content, both public and private, to recipients. Telemarketers and political organizations use both land line telephones and cellular phones to deliver message content to recipients as well as gather demographic data. The most recent method to deliver message content is the use of a recipient's email account and even a recipient's business or work email account.

Marketing and advertising is constantly searching for ways and means to deliver publisher message content in a more focused manner in order to optimize results for monies spent on marketing and advertising. For example, marketing and advertising rates for radio and television vary with the time of day and the programming event on radio or television. Stationary signage rates vary with geospatial location, usually based on the traffic flow of people that have visual contact with the signage. These techniques are still based on mass numbers of recipients yielding a very small percentage of results. To better focus on types of recipients, advertising will apply product and service advertisements based on the audience of a radio or television programming event, especially sports programming. This works well for large advertisers but is too expensive for small local businesses that offer sports products and services that would also be applicable to the viewing audience.

As technology evolves, especially in wireless technology, advances in miniaturization, lower power consumption and display technology provides technology enablers that allow for multiple modes of message content as well as delivery methods. Today the modes of message delivery range from simple text messaging to streaming audio and streaming video in the palm of a recipient's hand. The delivery methods range from traditional stationary and mobile static signage to wireless portable devices.

All of the traditional methods to deliver message content deliver results based on the volume of message content delivered to a volume of recipients. These methods are usually not focused on either the recipient's need for the message content or the geospatial location of the recipient which would more easily permit the recipient to take immediate action on the publisher's message content.

Recipients also have a need to find products and services and these needs change with geospatial location and time. This is especially relevant when the recipient is traveling or is at a geospatial location where the recipient does not have familiarity with the local retail infrastructure, surface streets or businesses. In addition, events that occur regarding the recipient also create a recipient's dynamic need for products and services not needed prior to the event.

Publishers spend monies on message content, some of which is seasonal, some of which is market driven, some of which is event driven. For example seasonal items such as clothing, need to purge end of season stock in order to make room for the next season's stock. An example of market driven items, such as a new movie, may only appear at certain theatres. An example of event driven items, such as a gas fired electric generator, may be caused by power outages resulting from a severe storm.

Today recipients are inundated with irrelevant message content yet still have a need for specific message content based on the current needs of the recipient and the recipient's geospatial location. The challenge is how to deliver message content that the recipient needs and allows the recipient to acquire the product or service needed in a timely manner.

The product or service for the recipient can also be provided from the public sector. Emergency information, such as evacuation routes, can be broadcast to both stationary and mobile dynamic display devices. Today Amber Alerts generated by law enforcement on public dynamic display devices could be delivered on private stationary and mobile dynamic display devices dramatically increasing the coverage for public service message delivery.

Existing technology and its components and methods are described hereinafter. The existing state of the art and its components and methods can be seen in the following art.

U.S. Pat. App. 2003/0055725 A1 (hereinafter referred to as the '725 patent application) discloses an end to end system that uses the Internet and wireless portable devices with subscribers. This invention discloses pushing lists of advertisements, converted from advertiser inputs via an advertiser input screen, stored in a database, converted to a format supported by the subscriber's wireless display device from which the subscriber selects advertisements of interest to be further converted and pushed to wireless subscribers.

U.S. Pat. App. 2002/0120518 A1 (hereinafter referred to as the '518 patent application) discloses a system and method for using public display devices in conjunction with kiosks to gather demographic information about the people that would see the display. The kiosks would dispense shopping bags or offer some other form of compensation for viewers entering demographic information. Once demographic information is entered the data base server would display advertisements specific to the demographic data entered at the kiosk. Another embodiment would be using cameras to gather demographic information on gender, race and age to determine what advertisements to display.

U.S. Pat. App. 2002/0087401 A1 (hereinafter referred to as the '401 patent application) discloses a method and system to "broadcast advertising to a mobile communication device". The '401 patent application provides a mobile device driving directions to the advertising sources. FIG. 1 of the 401 patent application also discloses a plurality of "advertising broadcast systems" and not a central system as disclosed by this invention. FIG. 3 of the 401 patent application discloses GPS used as a locating means for display booths and the mobile device.

U.S. Pat. No. 5,848,397 (hereinafter referred to as the '397 patent) discloses a method and apparatus for displaying advertising content on a client's computer system using email delivery. The '397 patent discloses a client submitting a profile that determines advertising content scheduled for the client.

U.S. Pat. No. 7,228,341 (hereinafter referred to as the '341 patent) discloses a method whereby there are five different scheduling algorithms for scheduling the play back of audio or video. The content is scheduled on a plurality of media player units each controlled by a player controller. The '341 patent relates to the scheduling methods for content on "media players." The invention allows publishers to determine the start date, start time, end date, end time, interval, duration and geospatial location of the stationary or mobile dynamic display devices for message content to recipients.

U.S. Pat. App. 2003/0080999 (hereinafter referred to as the '999 patent application) discloses a method and apparatus for the delivery of advertising content to a plurality of "media outlets" including all traditional forms of advertising, printed and electronic. The '999 patent application has the concept of a "seller interface" and a "buyer interface" and resembles an E-commerce system whereby sellers create advertisements, manage inventory and process electronic orders from buyers.

U.S. Pat. No. 6,009,409 (hereinafter referred to as the '409 patent) discloses "A system and method for scheduling and controlling delivery of advertising in a communications network and a communications network and remote computer program employing the system or the method." The '409 patent discloses in FIGS. 1-3 a method if displaying advertising content on a region of the screen of a computer monitor.

U.S. Pat. App. 2001/0003846 (hereinafter referred to as the '846 patent application) discloses using a Web server to distribute streaming media to home computers and being able to originate content from a home computer notated as "Home Based Processing Unit." There is no disclosure in the '846 patent application related to geospatial location based message.

U.S. Pat. App. 2002/0178445 A1 (hereinafter referred to as the '445 patent application) discloses in FIG. 1 the subscriber receiving advertisements on their home television or home computer and there is no illustration or disclosure of the subscriber receiving advertisement by portable wireless display devices or public dynamic display devices, stationary or mobile. The '445 patent discloses and claims a method for displaying advertising to subscribers based on either displaying an advertising guide menu or receiving a subscriber request for an advertisement to be stored for display when available.

U.S. Pat. No. 6,286,029 (hereinafter referred to as the '029 patent) discloses an intermediate server between kiosk computers and advertisers. According to the '029 patent this allows the kiosks to passively obtain content from multiple advertisers allowing the kiosk to be a more simple computer. In addition the intermediate server isolates the kiosks from direct access to the Internet allowing only appropriate content being displayed on the kiosk.

The enabling technology components and methods are described next. Dynamic digital display technology for outdoor use has several technology challenges: 1) Outdoor conditions have a wide dynamic range of ambient lighting conditions from darkness to full sunlight which challenges illuminated signage to be seen by the human eye, especially full sunlight. Large outdoor dynamic digital displays have typically been so expensive that they have only been used for special locations such as stadiums and casinos; 2) Outdoor dynamic digital displays must be ruggedized to survive the ambient conditions of outdoor temperatures and humidity; 3) Outdoor dynamic digital displays for billboard applications must be able to be manufactured in large form factors, be flexible to conform to uneven surfaces and be serviceable.

U.S. Pat. App. 2009/0146919 A1 (Hereinafter referred to as the '919 patent application) discloses a large scale LED display invention that solves the problems with dynamic digital displays described above. The '919 patent application also discloses "For example, where the center-to-center spacing between adjacent LED modules is 50 mm or greater, one or more red, one or more blue and one or more green LEDs can provide a light output for the display of 5,000 nits or greater depending upon the flux density of the LEDs so that the display 10 is suitable for use outdoors in sunlight."

Locating portable wireless communication devices indoors, particularly in reinforced buildings and subterranean structures, currently relies on wireless triangulation and/or Time Distance Of Arrival (TDOC) cellular techniques. The accuracy is poor and is directly proportional to tower density and the affects of multipath, caused by distortion effects on wireless signals. Inertial Navigation Systems (INS) would normally be used as a means of dead reckoning, but are typically large and very expensive and have poor performance at low acceleration rates such as walking/jogging/running. INS systems also consume a lot of power which is not desirable for portable devices. Accelerometers alone only provide linear rates of acceleration. To obtain rotational changes, such as a change in direction, gyroscopes must be used, again suffering from the same problems as accelerometers. Compass devices have been used to substitute compass heading changes as a means for determining a change in direction, but indoors, especially in reinforced buildings, the metal distorts magnetic fields and the compass solution has a high error factor.

U.S. Pat. App. 2009/0326851 (hereinafter referred to as the '851 patent application) discloses Micro Electronic Mechanical Systems (MEMS) technology applied to accelerometers and gyroscopes that has a small form factor, high accuracy that can dead reckon a person walking and consumes low power.

U.S. Pat. App. 2002/0194914 (hereinafter referred to as the '914 patent application) discloses "Inertial trackers have been successfully applied to a wide range of head mounted display (HMD) applications including virtual environment training, VR gaming and even fixed-base vehicle simulation, in which they have gained widespread acceptance due to their superior resolution and low latency."

A commercial example of this miniature INS technology can be found in a product named NavChip™. The NavChip™ product sheet states: "At roughly the size of a penny, the NavChip™ employs ground breaking MEMS technology to provide unprecedented low noise and stability. As the industry's first commercial IMU chip, the NavChip represents a 12-fold improvement in angular random walk and a 6-fold improvement in bias in-run stability compared to previous commercial-grade MEMS IMUs. This device claims less than 1% linear drift over distance traveled resulting in an accuracy of 10 meters for every Km traveled. The power consumption is 120 mW. Therefore the size, power consumption and error rate make it capable of accurately dead reckoning a portable wireless display device indoors. With a rotational error of 0.5%, accurate headings are also available.

U.S. Pat. App. 2008/0144264 (hereinafter referred to as the '264 patent application) discloses an invention that relates to a three part housing a wireless communication device that can be head worn with a multimedia display that flips up to provide a visor.

U.S. Pat. No. 7,454,290 (hereinafter referred to as the '290 patent) discloses a combined GPS (Global Positioning System) and INS (Inertial Navigation System) to determine the attitude (location, elevation & orientation) of a vehicle. The 290 patent in the "SUMMARY OF THE INVENTION" states: "This invention provides a low cost and robust GPS-INS attitude system for vehicles."

U.S. Pat. No. 6,031,454 (Hereinafter referred to as the '454 patent) discloses a UHF antenna based system that describes a radar responsive tag that utilizes very low power, has better azimuth and range precision that cellular CDMA methods, better penetration into subterranean and reinforced buildings, is less influenced by multipath errors and has a very small faun factor.

Recognition of images, as opposed to character (text) recognition such as OCR (Optical Character Recognition), as is known in the art, is not commonplace, especially for 3 dimensional aspects. An advertiser that desires confirmation that advertising content has been acknowledged by a viewer has few means to obtain this information electronically.

U.S. Pat. No. 7,639,881 (hereinafter referred to as the '881 patent) discloses a method for performing visual recognition tasks for image recognition in two dimensions. The 881 patent states: "The subject invention relates generally to recognition, and more particularly to systems and methods that employ grammatical parsing to facilitate in visual recognition tasks." The invention disclosed herein uses visual recognition as a resident application on portable wireless display devices both hand held and head mounted.

Clearly, there is a need for an improved end to end system for message content delivery based on the current geospatial location of the recipient for both private and public publishers of message content that improves the current state of the art. Additionally, there is a need to provide this new capability to small businesses and individuals as well as traditional advertising companies and large businesses.

SUMMARY OF THE INVENTION

According to the present state of the art, it is therefore the object of this invention to provide an end to end system comprised of (1) existing, (2) enabling and (3) newly disclosed technology components, apparatuses and methods that uniquely addresses needs of publishers and recipients (i.e. subscribers and non subscribers) for the delivery of message content based on geospatial location of the recipients and the geospatial location of dynamic display devices both stationary and mobile, both outdoor and indoor.

It is another object of this invention to provide for the delivery of message content based on date and the geospatial location of dynamic display devices both stationary and mobile, both outdoor and indoor.

Another object of this invention to provide for the delivery of message content based on date and time interval and the geospatial location of dynamic display devices both stationary and mobile, both outdoor and indoor.

Still yet another object of this invention to provide for the delivery of message content based on day of the week or day of the week and time interval and the geospatial location of dynamic display devices both stationary and mobile, both outdoor and indoor.

A further object of this invention to provide for the delivery of message content based on a subscriber's request for specific message content based on geospatial location of the subscriber.

Another object of this invention to provide for the delivery of message content based on a subscriber's request for specific message content based on geospatial location of the subscriber and 1) date or day of the week or the date or 2) date or day of the week and a time or time interval.

Yet another object of this invention is to provide publishers with data and statistics of recipient observation of publisher's message content.

These and other objects are achieved via an end to end system comprised of methods and apparatuses that utilizes geospatial location as a basis of message content delivery. This invention integrates publishers and recipients of message content and reduces the amount of meaningless message content that inundates recipients and better focuses a publishers' message content to recipients. Additionally, a new portable wireless display device is disclosed that provides valuable feedback to publishers related to positive confirmation of consumer viewing of publisher message content.

Publishers can be private or public entities. Recipients are comprised of subscribers and non subscribers. Message content is delivered on a plurality of dynamic display devices which can be portable wireless, mobile wireless signage or stationary signage, indoor or outdoor. A central system integrates publishers and recipients across the Internet and implements a high performance, available and reliable Service Oriented Architecture (SOA) providing services to publishers and recipients. For publishers which are advertisers, the end to end system provides feedback information in real time regarding subscribers that are viewing message content which is a valuable reinforcement for the development of advertising message content.

The present invention thus discloses several apparatuses, techniques and methods regarding improved publisher message content delivery based on geospatial location/date/time domain of recipients that facilitates the objectives of this invention.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE FIGURES

FIGS. 19(a)-19(j) are a table (Table 1) describing different video formats.

FIGS. 20(a)-20(p) (Table 2) are a table describing different audio formats.

FIGS. 21(a)-21(bb) (Table 3) is a table describing the different graphic formats.

FIG. 22 is a table (Table 4) describes the different markup language types.

Similar reference characters refer to similar parts throughout the several views of the drawings.

DETAILED DESCRIPTION OF THE INVENTION

Figure 1:
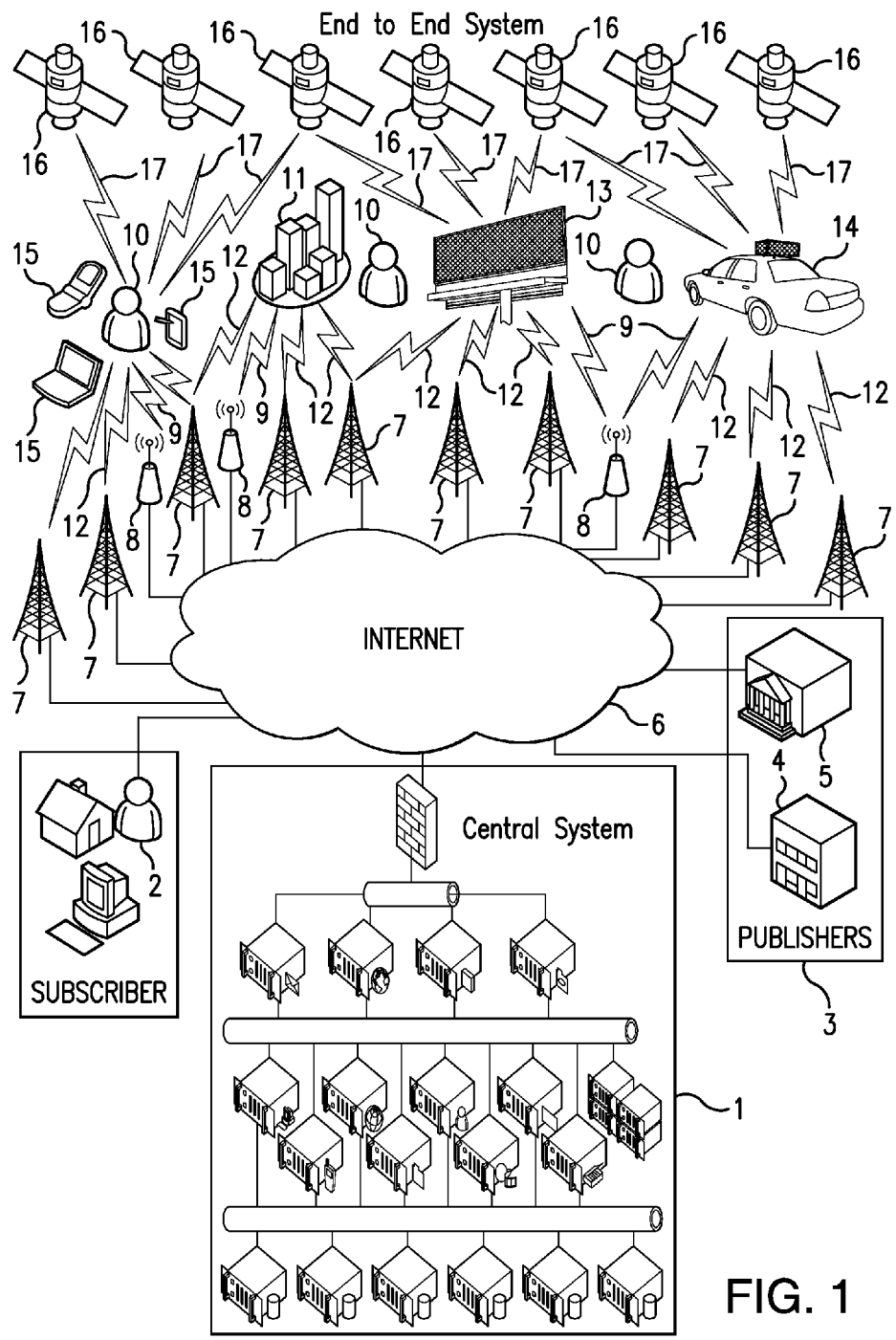
FIG. 1 is a schematic view of the end-to-end system of the present invention.

The end to end system depicted in FIG. 1 shows the components for geospatial location based delivery of message content for text, audio, graphics and video. The data types of streaming audio and streaming video as message content delivery are encompassed herein.

The central system 1 interfaces subscribers 2 of message content to publishers 3 of message content utilizing the communications infrastructure provided by the Internet 6, the wireless network 7 and WiFi and WiMax networks 8. The central system 1 also interfaces recipients 10 of message content to publishers 3. The end agents of message content delivery are portable wireless display devices 15 with recipients 10, indoor stationary dynamic display device signage 11, outdoor stationary dynamic display device signage 13, and outdoor mobile dynamic display device signage 14. The role of the central system is to deliver message content by the geospatial location of the recipient 10 who is either a subscriber 2 or a non subscriber 10, (i.e. everyone else).

The geospatial location of the recipient 10, who is the superset comprised of subscribers 2 and non subscribers 10, is the key attribute since it allows the recipient 10 to act or respond based on the type of message content delivered. The central system 1 uses the geospatial location of the portable wireless display devices with subscribers 2, a subset of recipients 10, to deliver message content specifically requested by the subscribers 2.

The geospatial location of the recipients 10 can be obtained by several methods:

If the recipient is a subscriber, then the subscriber's portable wireless display device can provide its current geospatial location to the central server by the following means;

Cellular triangulation is a method known to those familiar in the art whereby the cellular network 7 determines the geospatial location of the portable wireless display devices 15 based on the signal 12 strength of the portable wireless display devices 15 received by a plurality of cell towers of the cellular network 7. Conversely, if the portable wireless display device 15 is provided the latitude and longitude of nearby cell towers of the cellular network 7, the portable wireless display device 15 can also compute a triangulated geospatial location result based on the received signal strength of the corresponding nearby towers of the cellular network 7 and report this geospatial location to the central system 1.

TDOA, or Time Difference Of Arrival, as is known in the art, utilizes precise time known to both the portable wireless display device 15 and the cellular network 7 to compute distance based on the time it takes for the wireless signal to propagate between the towers of the cellular network 7 and the portable wireless display device 15. A more precise geospatial location is obtained by using a plurality of nearby cell towers in the cellular network 7. The computed geospatial location is then reported to the central system 1 by either the portable wireless display device 15 if it knows the geospatial location of the towers or the cellular network 7.

Satellite pseudo range geospatial location systems, such as GPS (Global Positioning System) 16 or the similar Soviet GLONASS geospatial location system transmit radio signals 17 which are used by GPS and GLONASS receivers to compute triangulated geospatial location information. When a portable wireless display device 15 has a GPS or GLONASS receiver it can compute its geospatial location and report its geospatial location to the central system 1.

WiFi, Bluetooth or WiMax Networks 8, since they are short range, can provide their geospatial location information to the central system 1 when communicating with a portable wireless display device 15.

Inertial Navigation System (INS) low power chip solutions as disclosed in the 851 patent, integrated with the portable wireless display device 15, can provide the dead reckoned geospatial location of portable wireless display device if it is indoors or in a location where satellite navigation signals 17 or terrestrial wireless signals 9 and 12 cannot be received or transmitted.

If the recipient 10 is not a subscriber 2, then the recipient's 10 geospatial location can be provided by the geospatial location of either the indoor stationary dynamic display device 11, the outdoor stationary dynamic display device 13 or the mobile dynamic display device 14. The recipient's portable wireless display device may also broadcast it's identification to these dynamic display devices 11, 13, and 14 using Bluetooth and Wifi or WiMax 8 wireless communications. Additionally, the cellular wireless network 7 and Wifi or WiMax networks 8 may provide the current geospatial location of any portable wireless display device 15 currently connected to their networks.

Once the central system 1 knows the geospatial location of recipients 10 and subscribers 2, it can fulfill the message content delivery provided by the publishers 3. Publishers 3 are comprised of private 4 and public 5 entities. The publishers 3 are provided a plurality of means to provide message content to the central system 1.

Examples of Publishers: One example of private publishers 4 are traditional product advertisers. In contrast to current message content delivery systems inundating recipients with non relevant message content, this invention provides advertisers with a much more targeted focus on the message content to be delivered driven primarily by the geospatial location of the recipient 10 or geospatial location and message content requests by a subscriber 2.

Another example of private publishers 4 is employment boards posting available job postings message content being delivered to local recipients 10 and subscribers 2 regarding employment sites.

Other examples of private publishers 4 are individuals with traditional auctions, used car sales and yard sales.

Other examples of private publishers 4 are business close-outs and liquidations message content being delivered to local recipients 10 and subscribers 2.

Other examples of private publishers 4 are traditional services such as restaurants, movie theatres, theme parks and spas message content being delivered to local recipients 10 and subscribers 2.

Other examples of private publishers 4 are employee announcements tailored for the geospatial location of the employee recipients 10.

Other examples of private publishers 4 are special events such as sporting events and grand openings message content being delivered to local recipients 10 and subscribers 2.

One example of public publishers 5 is public service announcements such as evacuation routes, alternate traffic routes due to construction, parking, accidents, congestion or special events, severe weather reports and amber alerts by law enforcement being delivered to local recipients.

Another example of public publishers 5 is public event announcements such as fireworks displays being delivered to local recipients.

Other examples of public publishers 5 are public employee announcements tailored for the geospatial location of the public employee recipients 10. This would especially useful to coordinate public employee recipients 10 pending, during or after a catastrophe, natural or manmade. Such public employees would be first responders, utility workers, ambulance, law enforcement, local, state and federal agencies.

Figure 2:
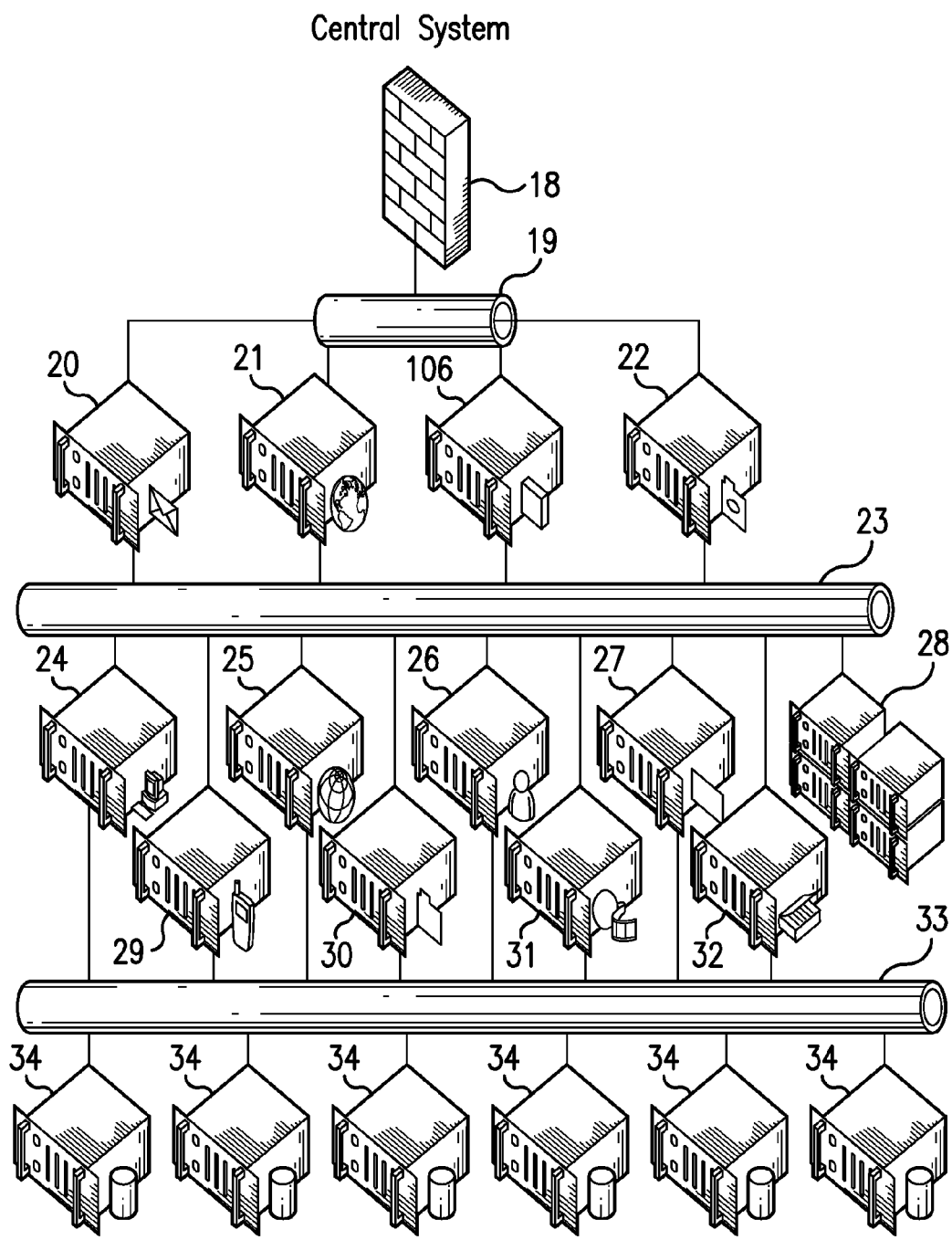
FIG. 2 is a schematic view of the central system component of the present invention

FIG. 2 depicts a detailed architecture of tiered service components in a traditional Service Oriented Architecture (SOA) implementing end to end transactions as threads of services, as known in the art. Although FIG. 2 depicts all of the server components in one geospatial location, the architecture can be distributed, clustered and federated as known in the art across the Internet. Distributed server architectures provide availability should a portion of the Internet or a server location suffers congestion or an outage. Clustered server architectures provide availability, manageability and scalability. Federated server architectures provide allows for partitioning of processing load to be shared amongst multiple servers thereby increasing throughput. Therefore the distributed, clustered and federated architecture of the central system SOA architecture disclosed herein is scalable, reliable and high performance.

The top tier of the central system 1 architecture interfaces with the Internet 6 via firewalls 18 as is known in the art of Internet based information processing and E-commerce. The firewalls 18 protect the central system 1 from such things as denial of service attacks and the infusion or injection of viruses as known in the art into the operating systems and applications executing on servers behind the firewalls 18.

The $1^{st}$ tier subnetwork 19 interfaces the servers that provide standard Internet services of E-mail, Websites, device communication gateways and File Transfer Protocol (FTP). The E-mail servers 20 provide email services to publishers 3, subscribers 2, E-commerce servers 27 and the application servers 28. The Web Servers 21 host the Web services that provide the browser services between the Application Servers 28 and the other components of the end to end system such as subscribers 2, publishers 3 and portable wireless display devices 15. The FTP servers 22 provide file transfer services to subscribers 2, publishers 3 and portable wireless display devices 15, indoor stationary dynamic display devices 11, outdoor stationary dynamic display devices 13 and mobile dynamic display devices 14. The gateway servers 106 provide availability, high throughput and assured delivery of data from recipients' 10 and subscribers' 2 portable wireless display devices to the gateway servers 106 of the central system 1. The gateway servers 106 also provide assured delivery of publishers 3 message content to portable wireless display devices 15 as well as mobile and stationary dynamic display devices 35, 36, 37, 39, 40, 41, 11, 13, 42, 45, 46. The gateway servers 106 provide flow control by sending UDP packets with updated lists of gateway server 106 IP addresses to prevent congestion or to route around gateway outages.

The $2^{nd}$ tier subnetwork 23 interfaces the business logic implemented in the servers 24, 25, 26, 27, 28, 29, 30, 31, 32, 33 to the web services on the $1^{st}$ tier Web services 20, 21, 106 and 22. The management servers 24 manage resources, monitors and controls performance for the business logic tier, especially congestion on the real time gateway servers 106. The geospatial information servers 25 provide translation between coordinates of latitude and longitude, postal address layers, map layers and other feature layers for the business logic tier. The real time communication servers 26 provide the services for chat, text messaging, voice, graphics, streaming audio and streaming video for the business logic tier. The E-commerce servers 27 provide E-commerce services for subscribers 2 and publishers 3. The application servers 28 provide a plurality of application services for the central system 1, subscribers 2, publishers 3, recipients 10 and dynamic display devices 35, 36, 37, 39, 40, 41, 11, 13, 42, 45, 46. The application servers 28 provide the custom applications that implement the business logic for the central system 1. The mobile information servers 29 maintain attribute information specific to each portable wireless display device 15. The file servers 30 maintain the application files that are uploaded and downloaded between the components of the end to end system. The streaming media servers 31 that deliver streaming audio and streaming video content to portable wireless display devices 15, stationary and mobile dynamic display devices 35, 36, 37, 39, 40, 41, 11, 13, 42, 45, 46. The directory servers 32 maintain a directory of all components of the end to end system. All storage of temporary variables and service thread attributes for tier 2 servers are stored locally on the respective servers thereby not competing for data base servers 34. This is possible because of the SOA transactions that are data driven and data is never lost due to assured delivery end to end.

The $3^{rd}$ tier subnetwork 33 interfaces the business logic in the $2^{nd}$ tier to the clustered and federated data base servers 34. The data base servers 34 provide the usual and customary functions of storage, retrieval, updating and archiving of all data in the central system 1.

Figure 3:
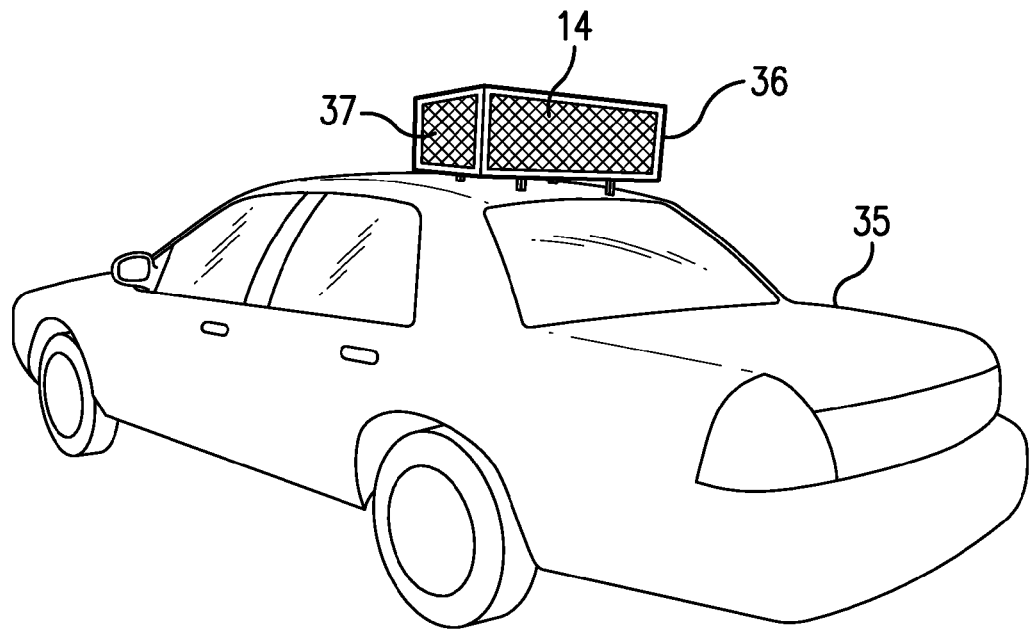
FIG. 3 depicts the concept of the outdoor mobile dynamic display device.

FIG. 3 depicts a typical example of a mobile dynamic display device 14, 36 and 37 mounted on top of a taxi 35. The dynamic displays are mounted in a triangular frame to provide message content to recipients 10 looking at both sides and rear of the taxi 35.

Figure 4:
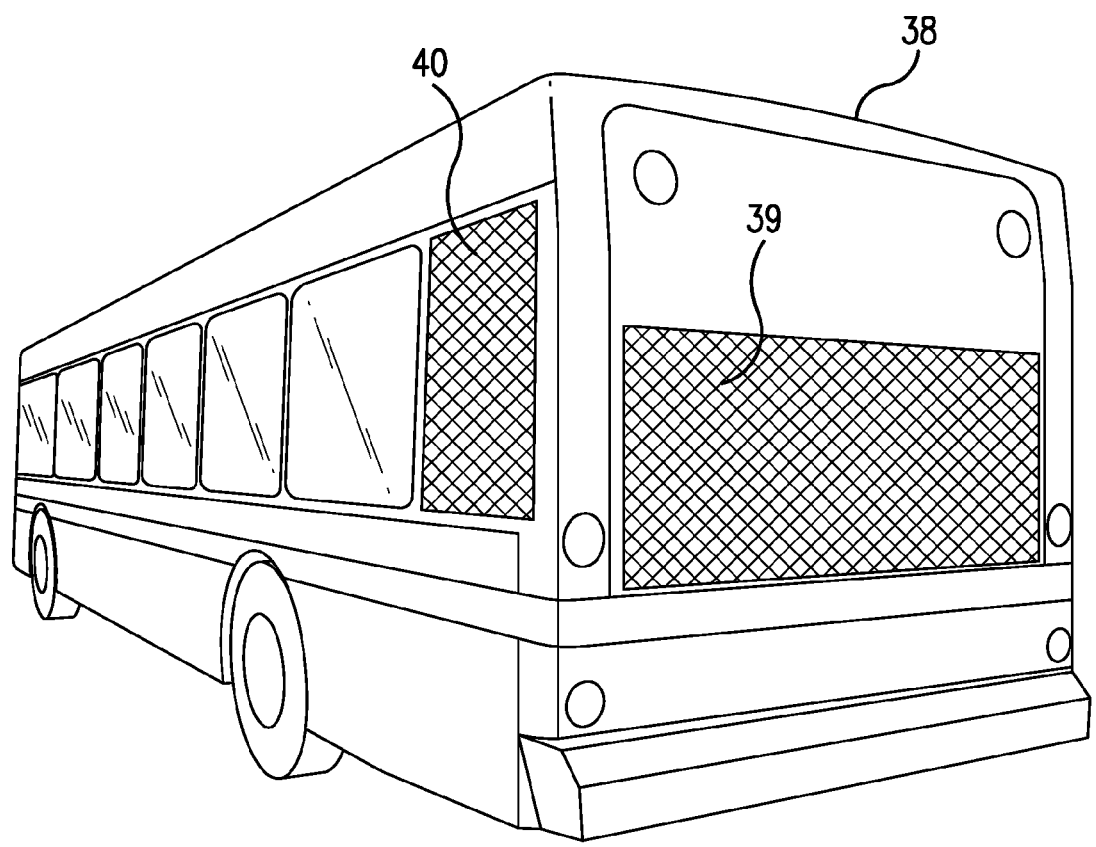
FIG. 4 depicts another implementation of the outdoor mobile dynamic display device.

FIG. 4 depicts another example of a mobile dynamic display device 39 and 40 mounted on a bus 38.

Figure 5:
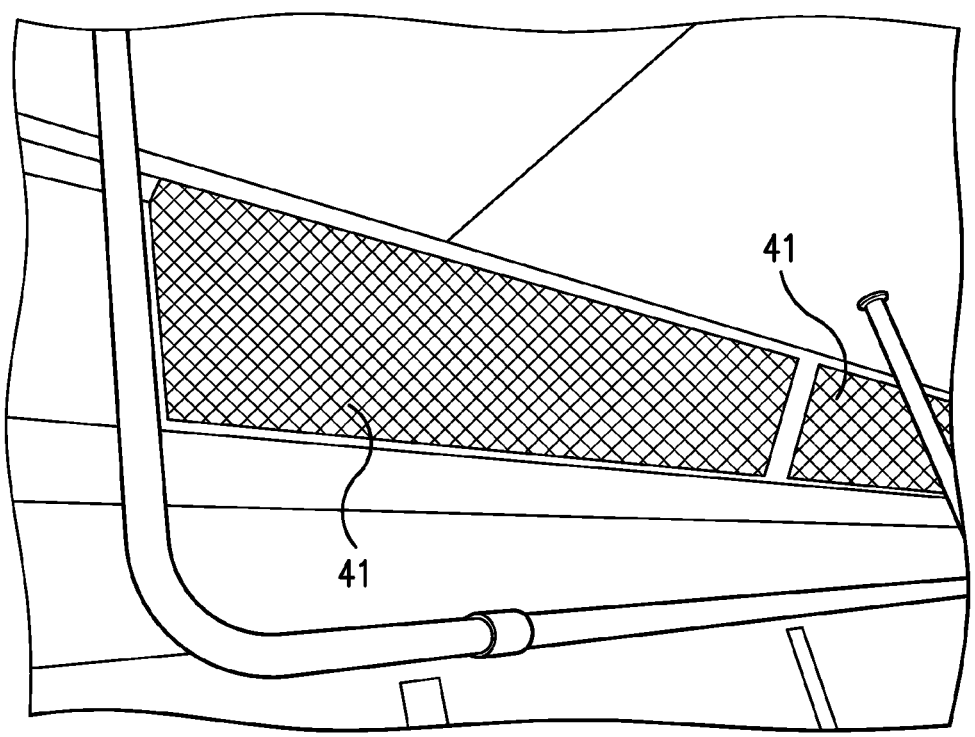
FIG. 5 depicts the concept of the indoor mobile dynamic display device.

FIG. 5 depicts another example of a mobile dynamic display device 41 mounted on the inside of a bus 38. Such an internal mobile dynamic display device 41 can also be mounted inside taxis 35, trains and subways.

Figure 6:
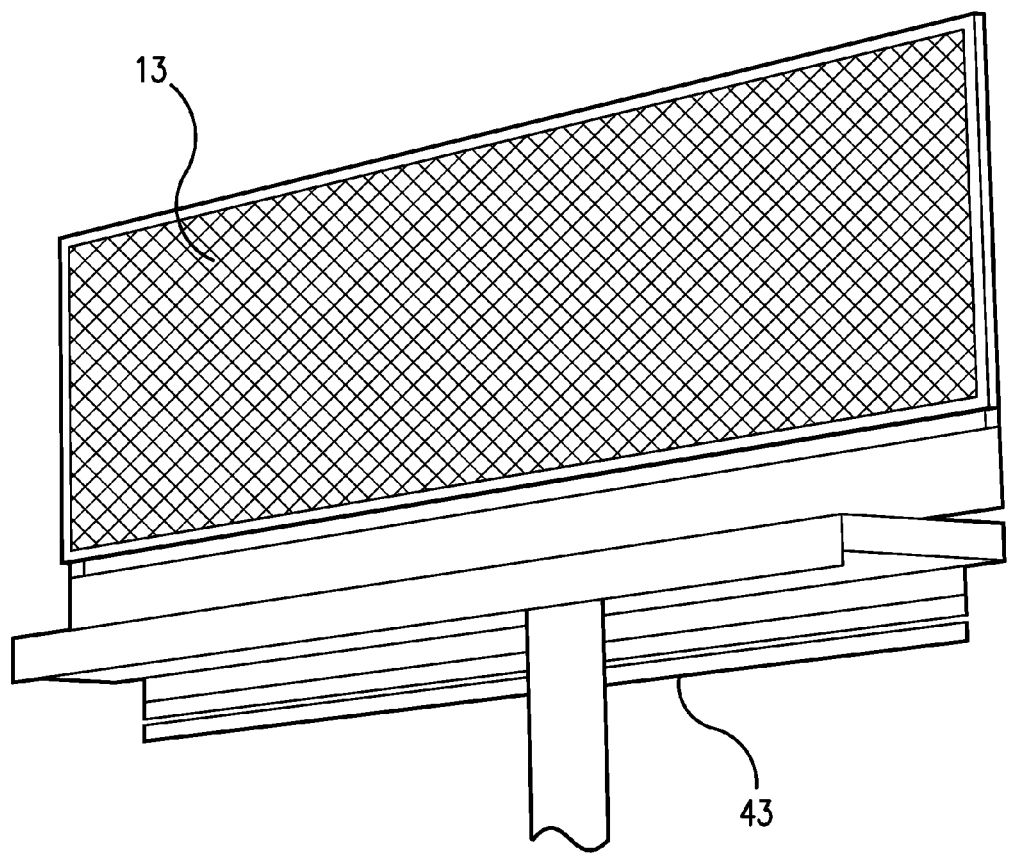
FIG. 6 depicts the concept of the outdoor stationary display device.

FIG. 6 depicts a typical example of an outdoor stationary dynamic display device 13 as an outdoor sign 43 along routes of travel.

Figure 7:
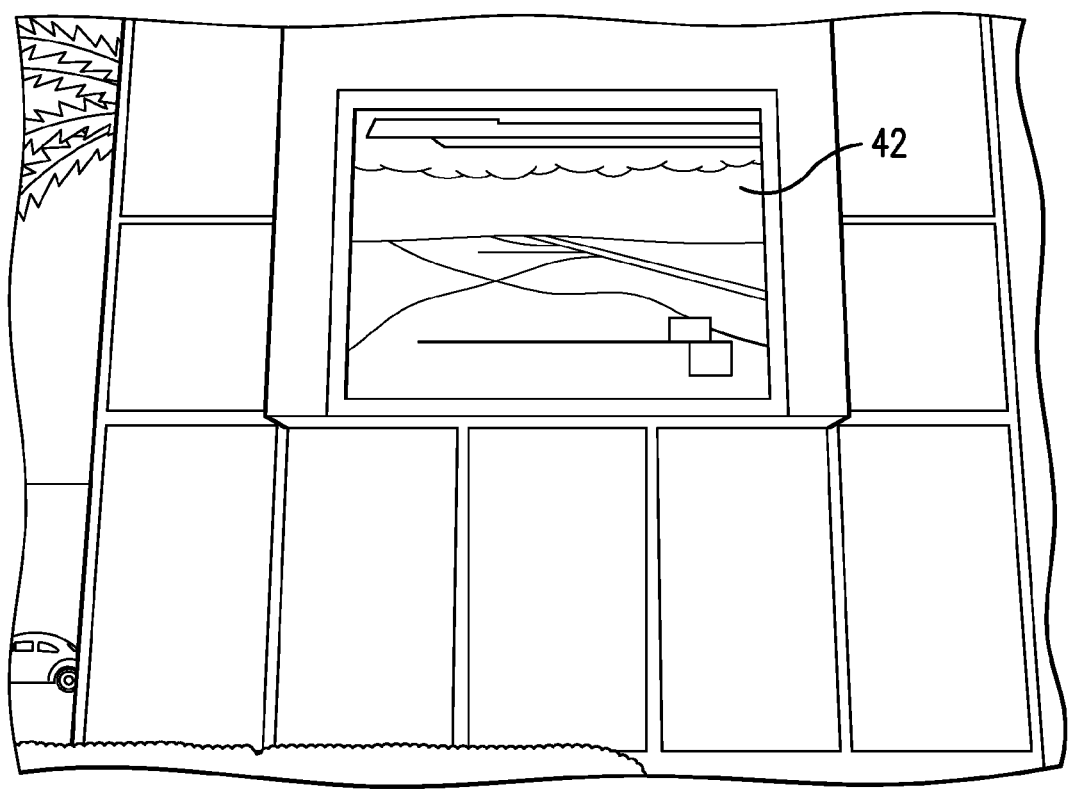
FIG. 7 depicts another implementation of the outdoor stationary dynamic display device.

FIG. 7 depicts another typical example of an outdoor stationary dynamic display device 42 as mounted on the side of a building.

Figure 8:
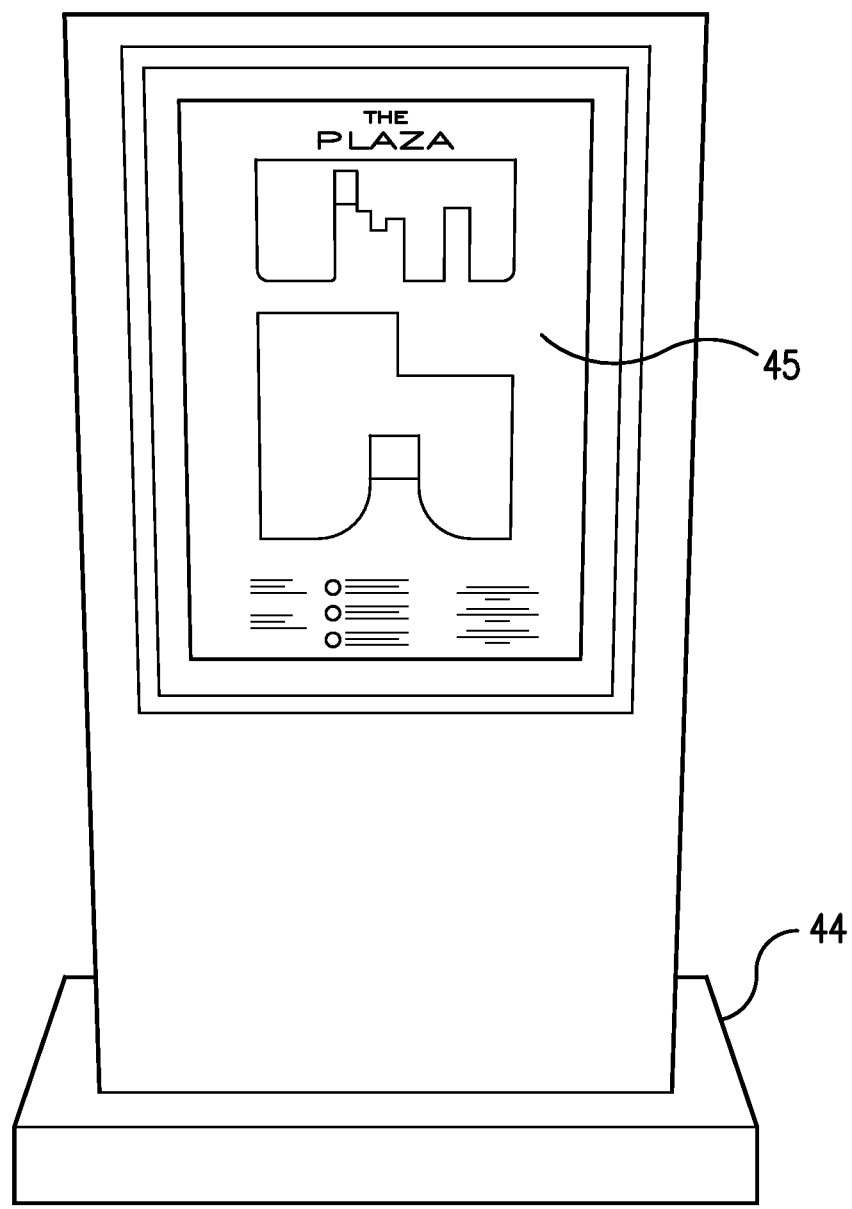
FIG. 8 depicts the concept of the indoor stationary dynamic display device.

FIG. 8 depicts a typical example of an indoor stationary dynamic display device 45 in a typical shopping center floor standing sign 44.

Figure 9:
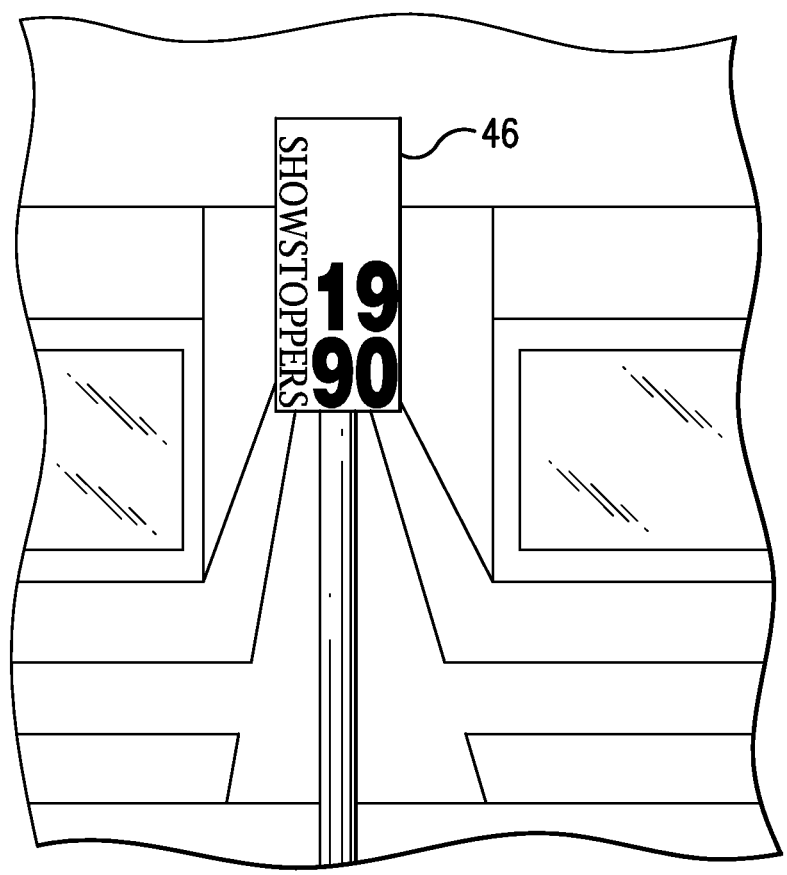
FIG. 9 depicts another implementation of the indoor stationary dynamic display device.

FIG. 9 depicts another typical example of an indoor stationary dynamic display device 46 in a typical shopping center pole mounted sign.

Figure 10:
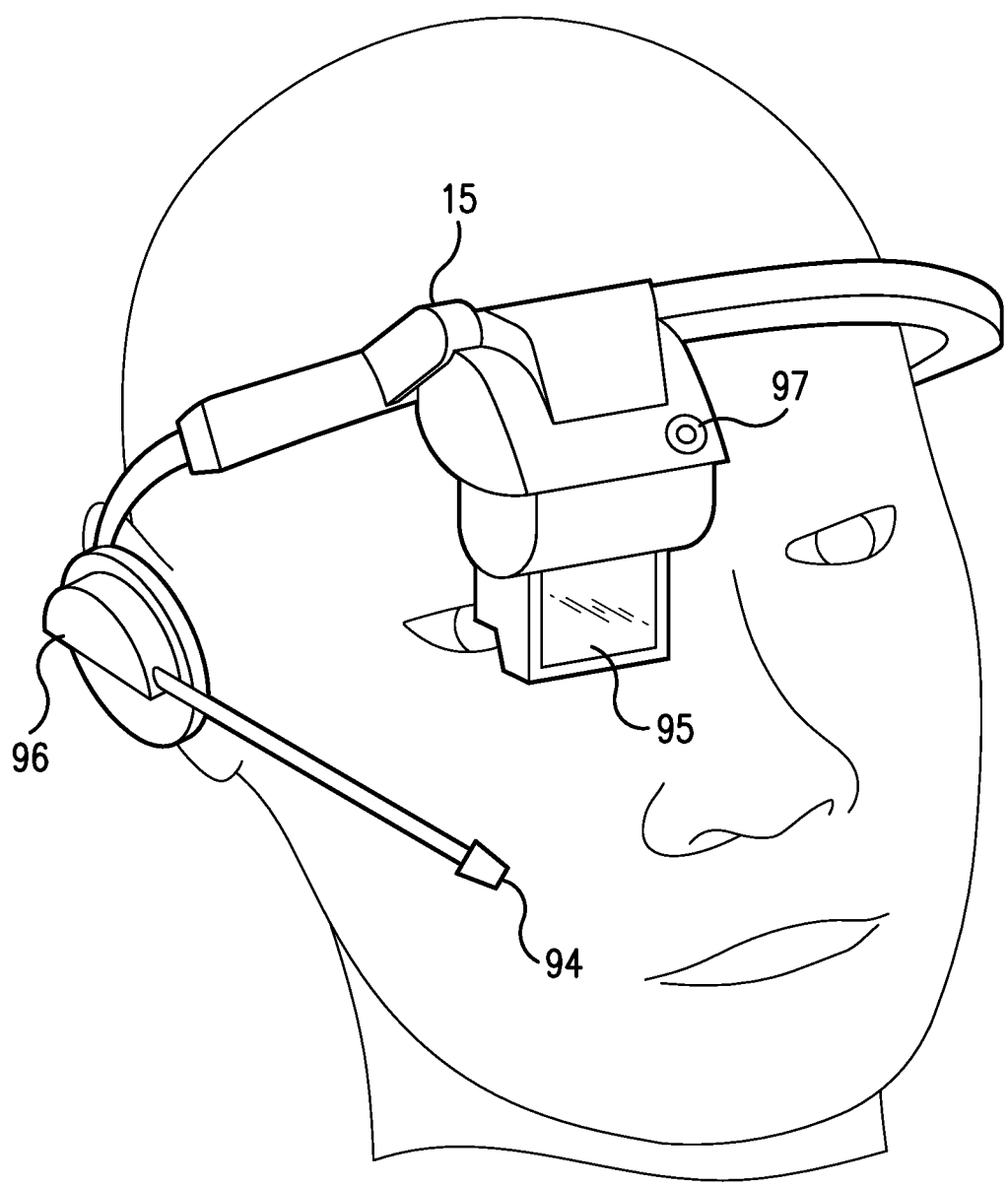
FIG. 10 depicts the concept of a portable wireless display device for publisher feedback for recipient viewing of dynamic display devices.

FIG. 10 depicts a head mounted portable wireless dynamic display device 15 that has earphones 96, a heads up display 95, a microphone 94 and a camera 97. This invention also implements speech recognition and text to speech generation as is known in the art for hands free operation.

Figure 11:
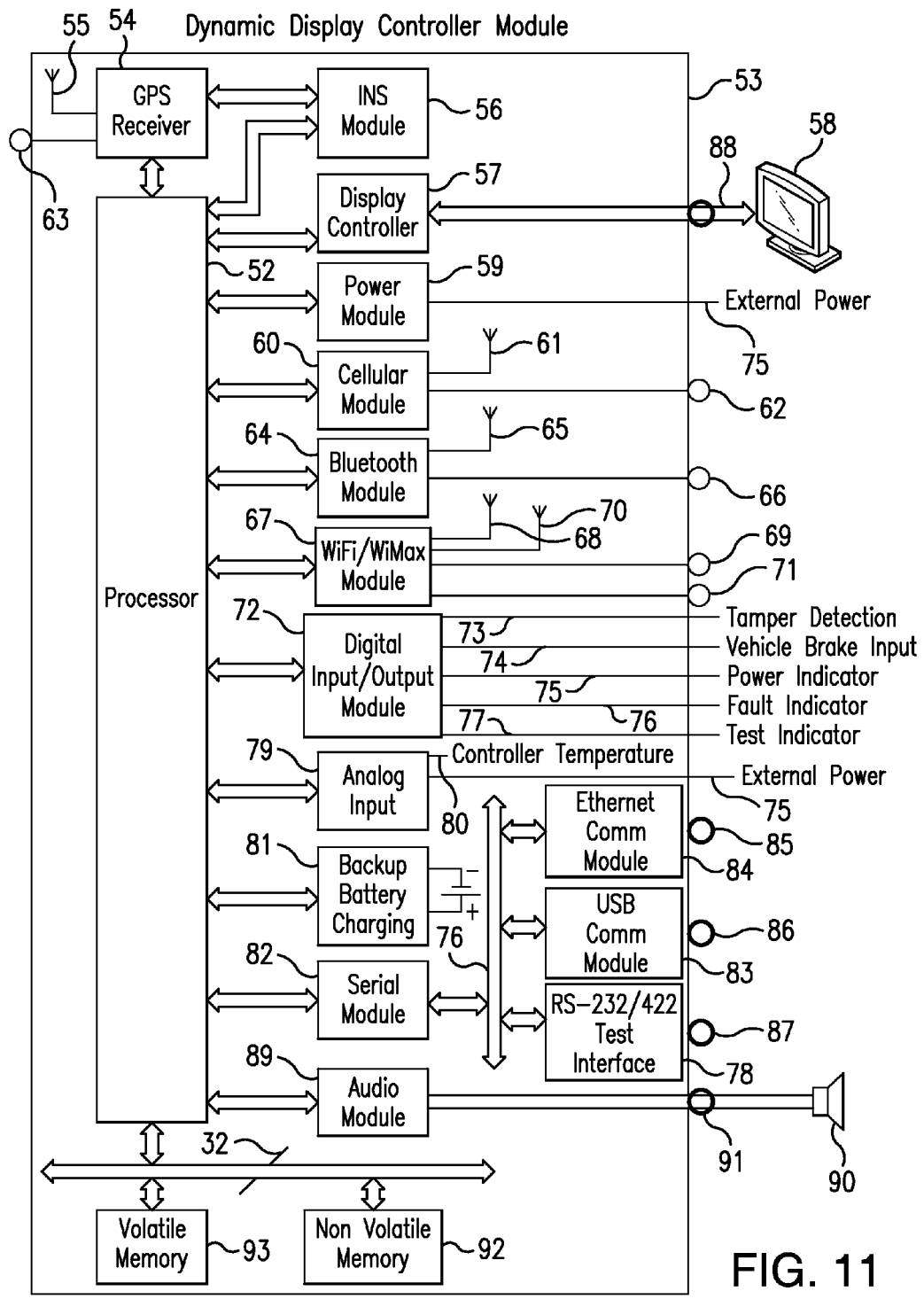
FIG. 11 depicts the functional block diagram for the controller for the stationary and mobile dynamic display device.

FIG. 11 is a functional block diagram of the controller for the dynamic display devices, both mobile 14, 35, 36, 37, 39, 40, 41 and stationary 11, 13, 42, 45, 46. The case of the dynamic display controller 51 is IP67 (Ingress Protection) rated as known in the art, to be totally protected against dust intrusion and water intrusion to an immersion depth to one meter.

The processor component 52 of the dynamic display controller module 53 is a typical embedded processor as is known in the art for devices. One such example is the ARM 7, ARM 9 and ARM 11 family of 32 bit processors from ARM. Such processors are low power, small form factor and can interoperate with up to 16 attached coprocessor modules such as display controllers, audio controllers, wireless communication modules, serial bus controllers, digital input/output modules and analog input/output modules.

The GPS receiver 54 receives the pseudo range messages 17 from the GPS satellites 16 (or any other satellite constellation such as GLONASS) in order to determine the geospatial location of the dynamic display. Other location means such as radar responsive tags or INS could be used in lieu of the GPS receiver 54 when GPS is not available. The GPS antenna 55 can either be mounted inside the IP67 case for the dynamic display controller module 53 or to an external antenna using an RF connector 63. For a dynamic display that is stationary 11, 13, 42, 45, 46 the GPS receiver can be used to allow the processor 52 algorithms to calculate differential corrections for the GPS receiver 54 calculated positions versus the surveyed position of the stationary dynamic display 11, 13, 42, 45, 46. These differential corrections can be sent to the central system 1 geospatial information server 25 thereby allowing the central system 1 to apply differential corrections to all portable wireless dynamic display devices 15 and mobile dynamic display devices 14, 35, 36, 37, 39, 40, 41. These differential corrections can also be sent to portable wireless display devices 15 via short range wireless WLAN (802.11)/WiMax 67 and Bluetooth 64. This results in the ability to locate with a precision of a few centimeters instead of 10 meters. This especially important when locating portable wireless display devices 15 that are close to dynamic display devices, stationary 11, 13, 42, 45, 46 or mobile 14, 35, 36, 37, 39, 40, 41. Using a differentially corrected GPS geospatial location as the reference point for the INS comprised of a 6 degree of freedom accelerometer and gyroscope module 56 results in greater precision for the dead reckoning provided by the INS module 56 because there is more precision for the dead reckoning starting point and the inherent cumulative errors over time and distance are reduced with a higher precision starting point. The INS module 56 can be eliminated for stationary dynamic displays 11, 13, 42, 45, 46.

The dynamic display controller module for a mobile dynamic display device will report its geospatial location to the central server whenever it detects movement for a programmable period of time, whenever it acquires a geospatial location means or when it acquires communication means with the central system.

The display controller 57 provides the interface to different types of displays 58 interfaced to the display controller 57. The display controller will change its control signals based on the type of display 58 interface such as composite, analog or digital. Other attributes to accommodate are serial data, parallel data, synchronization frequency, range of colors, number of lines, number of pixels and screen size. The display controller 57 contains the industry standard interfaces for displays such as composite video, component video, VGA (Video Graphics Array), SVGA (Super VGA), DVI (Digital Video Interface), S-Video, and HDMI (High Definition Multimedia Interface). The external display 58 attaches to the dynamic display controller using a weatherproof connector 88.

Figure 18:
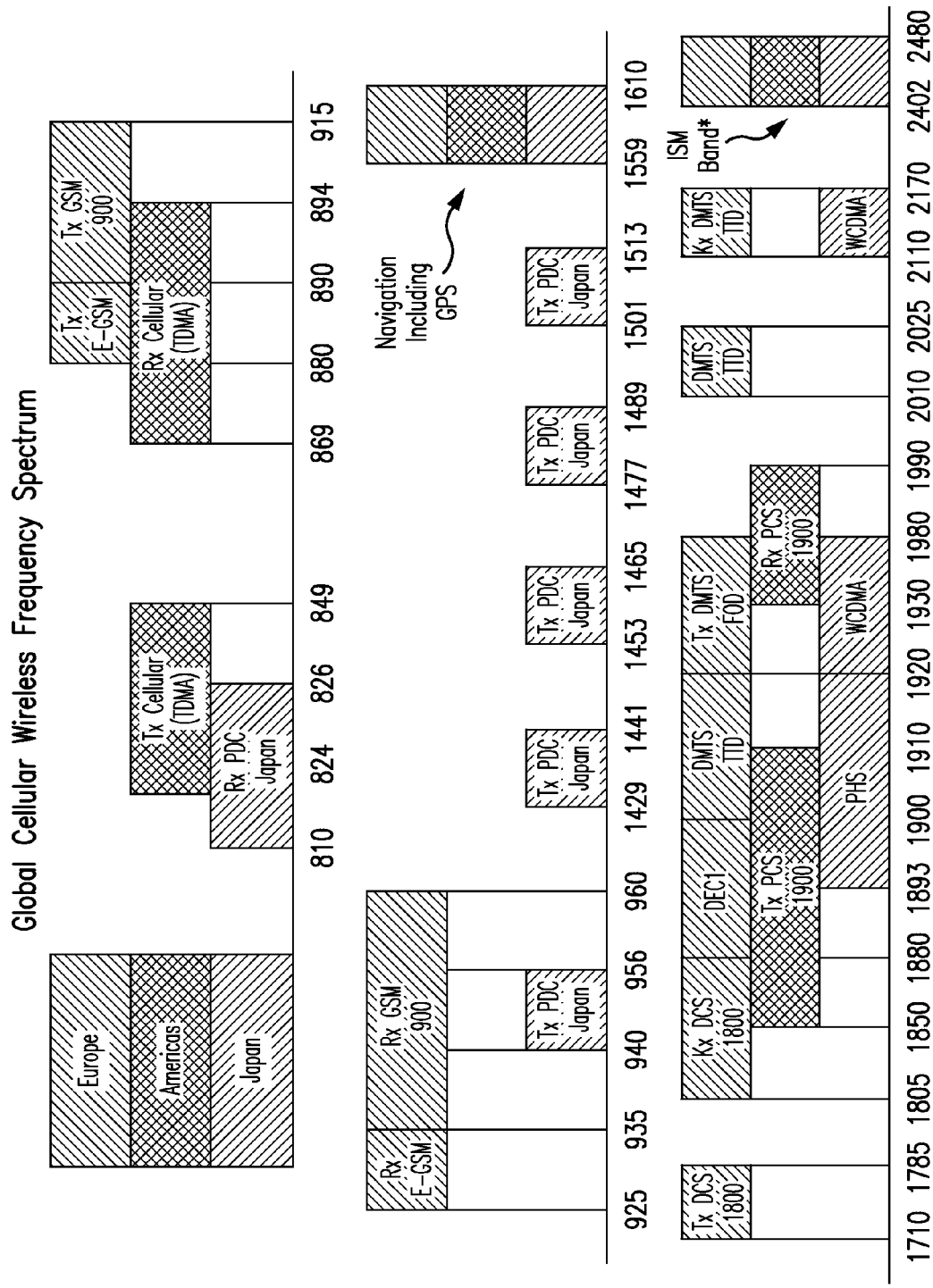
FIG. 18 depicts the global cellular wireless frequency spectrum

The power module 59 interfaces to external power sources that include 12-24 VDC, 110-200 VAC single phase 50-60 Hz, 220 two phase 60 Hz and 440 three phase 60 Hz. The power module 59 converts the external power to the lower voltages required by the modules and components comprising the dynamic display controller module 53. The cellular module 60 provides a wireless IP communications interface to the global wireless frequency bands described in FIG. 18. Currently all 4 frequency spectrums globally support SMS messages on the control channels as well as IP messaging, including UDP messages which are used for wireless communications. The initial message from the dynamic display controller module 53 is a stored SMS using a wireless phone number for the central server 1 to obtain a response SMS that contains the IP addresses of all gateway servers 106 and an encryption key unique for the dynamic display controller module 53. This same process is used for the portable wireless display devices 15. The wireless communications network 7 interfaces to the Internet 6 which provides an end to end IP (Internet Protocol) interface to the central system 1. The cellular module antenna 61 can either be mounted inside the IP67 case for the dynamic display controller module 53 or to an external antenna using an RF connector 62.

The Bluetooth module 64 provides no cost local wireless communications either to the central system 1 via the Internet 6 for portable wireless display devices 15 near the dynamic display controller module 53 or for wireless communications between the dynamic display controller module 53 and the portable wireless display devices 15. This link is used to exchange data and the unique Media Access Control (MAC) addresses of the dynamic display controller module and the portable wireless display device. This link is also used to exchange MAC addresses and data between the portable wireless display device 15 and either the central system 1 or the dynamic display controller module 53. The Bluetooth module antenna 65 can either be mounted inside the IP67 case for the dynamic display controller module 53 or to an external antenna using an RF connector 66.

The WiFi or WiMax module 67 provides a wireless IP communications interface either to the central system 1 via the Internet 6 for portable wireless display devices 15 near the dynamic display controller module 53, for wireless communications between dynamic display controller modules 53, or for wireless communications between the dynamic display controller module 53 in order to exchange data and MAC addresses. Using either 802.11 (WLAN or WiFi) or 802.16 (WiMax), dynamic display controller modules can provide a high speed communications interface and even locate portable wireless display devices 15 as well communicating with other mobile dynamic display devices 14, 35, 36, 37, 39, 40, 41 relative to the position of the dynamic display controller module's 53 current known position. This allows accurately locating a portable wireless display device 15, especially when the portable wireless display device 15 is using dead reckoning. The accurate position update can provide a geospatial location update to correct accumulated drift for the INS module integrated in the portable wireless display devices 15. Correspondingly, a mobile dynamic display device 14, 35, 36, 37, 39, 40, 41 that is currently using dead reckoning can get a geospatial location update when in close proximity to a stationary or mobile dynamic display device 35, 36, 37, 39, 40, 41, 11, 13, 42, 45, 46 receive the Bluetooth 8, WiFi 8 or WiMax 8 communications from subscribers and non subscribers broadcasting their MAC address. The WiFi/WiMax module antennas 68 and 70 can either be mounted inside the IP67 case for the dynamic display controller module 53 or to an external antenna using an RF connectors 69 and 71.

The digital input/output module 72 provides digital or discrete inputs and outputs for the dynamic display controller module 53. Tamper detection 73 for the dynamic display controller module 53 can be implemented either by a switch or photodiode that is activated when the IP67 case 53 is opened. The vehicle brake input 74 triggers the dynamic display control module to display "STOP" (or STOP in other languages) in big red letters to prevent vehicles behind the mobile dynamic display device 14, 35, 36, 37, 39, 40, 41 vehicle 35, 38 from colliding with the mobile dynamic display device 14, 35, 36, 37, 39, 40, 41 vehicle 35, 38 while stopping. The power indicator 75 displays the status of external power 75 and battery backup power 76. The fault indicator 76 displays a diagnosed fault within the dynamic display controller module 53. The test indicator 77 displays the status of successful built in tests or that test software is communicating to the dynamic display controller module 53 via the RS-232/422 Test Interface 78.

The analog input module 79 provides analog inputs for the dynamic display controller module 53. Dynamic display controller module 53 temperature 80 is provided by a temperature probe inside the IP67 case. External power 75 is also available so that the dynamic display controller module can report the level of external power 75 to the central system 1.

The backup battery charging module 81 keeps the backup battery 76 charged. The backup battery keeps the dynamic display controller operational during external power 75 failure. The backup battery charging module 81 reports the voltage level of the backup battery 76.

The serial communications module 82 provides a high speed serial communications interface to the processor 52. The serial communications module 82 connects to the RS-232/422 Test Interface 78, the USB (Universal Serial Bus) communications module 83 and the Ethernet communications module 84 via a high speed serial bus available on the processor 52. The RS-232/422 test interface has a weatherproof DB9 connector 87, the USB communications module has a weatherproof USB connector 86 Ethernet communications module has a weatherproof RJ45 connector 85 on the IP67 dynamic display controller module case 53. The audio module 89 provides the analog amplification and interface to speakers 90 attached to the dynamic display controller module 53 via connector 91.

The non volatile memory 92 contains the boot loader, the software update loader, the current software program version and the previous software program version for the processor 52. The software program herein referred to as business logic, can be updated "over the air" as is known in the art using any of the wireless modules 60, 64 and 67 or via the serial communication modules 78, 83 and 84.

The volatile memory 93 contains temporary data used by the software executing in the processor 52. The volatile memory 93 also contains the message content to be displayed as well as the scheduling information.

Figure 12:
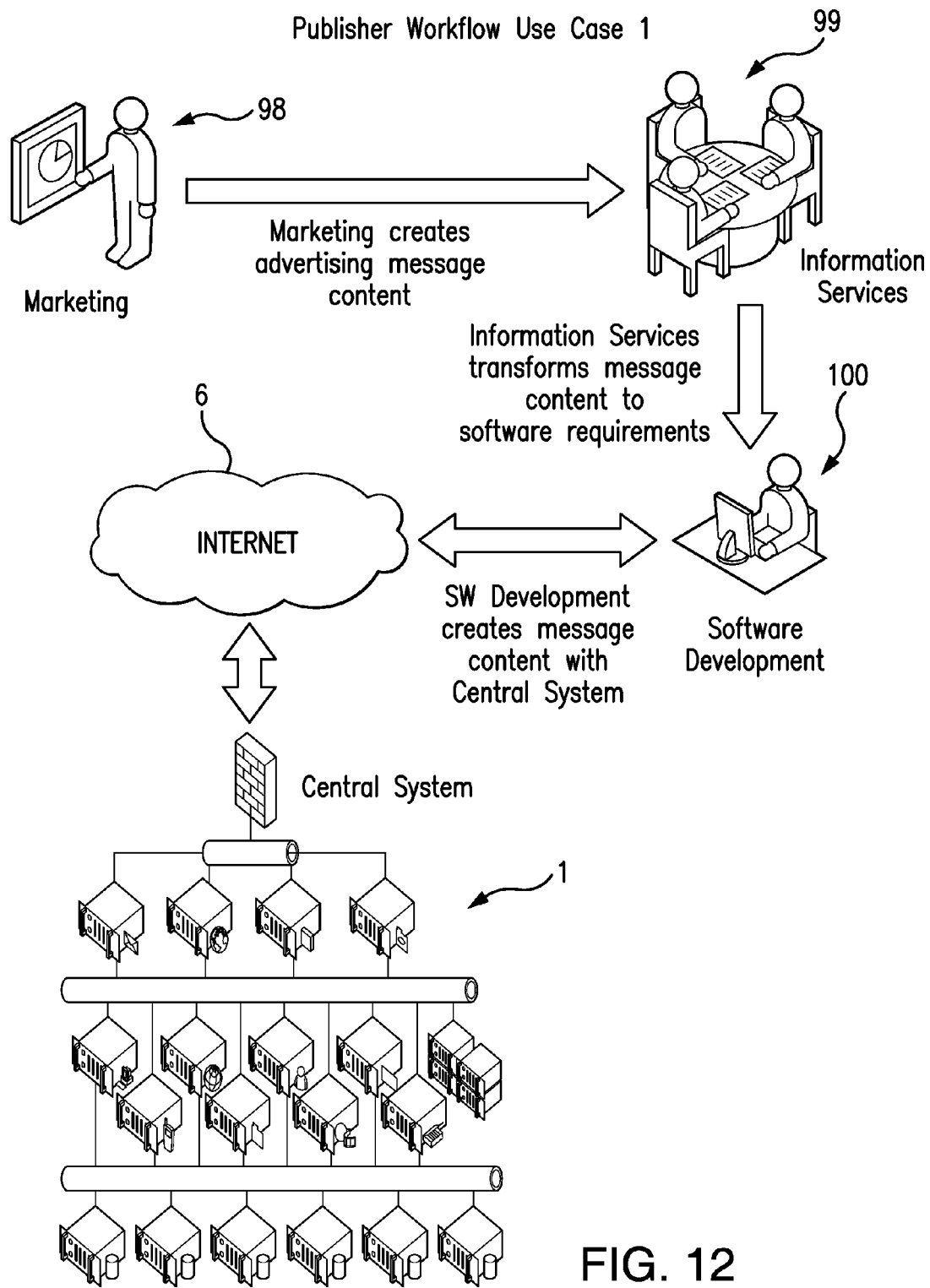
FIG. 12 depicts the publisher work flow use case 1.

FIG. 12 depicts the publisher 4 workflow use case of a typical advertiser. Marketing 98 creates the advertising message content requirements. The advertising message content requirements are provided to information services 99 who translates them into advertising message content software requirements and provided to software development 100. The developers 100 log into their accounts managed by the E-commerce servers 27 on the central system 1. The E-commerce servers 27 will track the parameters entered by the software developers 100 in order to generate the invoices for the services requested of the central system 1.

At this stage software development can proceed with one or more approaches to generate the advertising message content on the central system 1.

Software development 100 utilizes advertising message content creation, updating and deletion tools provided by the application servers 28 across a Web interface via the Web servers 21 of the central system 1. The Web interface allows for image data, streaming audio and streaming video content for the advertising message content to be uploaded via the FTP servers 22 to the central system 1.

Software development 100 utilizes in house software development tools for creating advertising message content. Once the advertising message content is created or updated, it is uploaded to the central system 1 using the FTP servers 22.

Software development 100 can direct the application servers 28 to existing publisher Web sites and FTP servers to obtain existing advertising message content. The central system 1 downloads the advertising message content.

Software development 100 can utilize all approaches to obtain a blended solution for advertising message content creation, updating and deletion.

Figure 13:
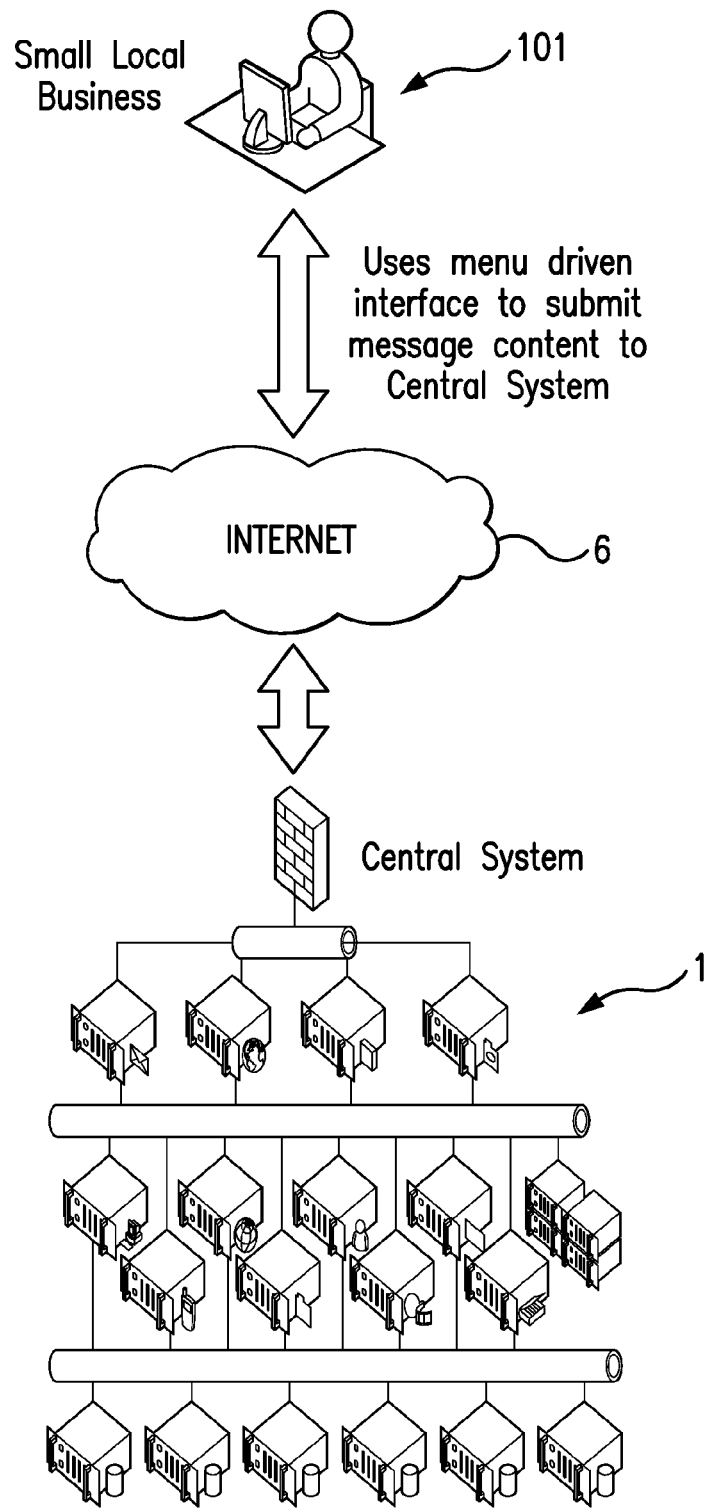
FIG. 13 depicts the publisher work flow use case 2.

FIG. 13 depicts the publisher 4 workflow use case of a typical small business 101. The small business owner 101 logs into their account managed by the E-commerce servers 27 on the central system 1. The E-commerce servers 27 will track the parameters entered by the small business 101 in order to generate the invoices for the services requested of the central system 1.

At this stage the small business 101 can proceed with one or more approaches to generate the advertising message content on the central system 1.

Small business 101 utilizes advertising message content creation, updating and deletion tools provided by the application servers 28 across a Web interface via the Web servers 21 of the central system 1. The Web interface allows for image data, streaming audio and streaming video content for the advertising message content to be uploaded via the FTP servers 22 to the central system 1.

Small business 101 can direct the application servers 28 to an existing small business Web site and FTP servers to obtain existing advertising message content. The central system 1 downloads the advertising message content.

Small business 101 can outsource the advertising message content to be created, updated and deleted to a third party software development company.

Small business 101 can utilize all approaches to obtain a blended solution for advertising message content creation, updating and deletion.

Figure 14:
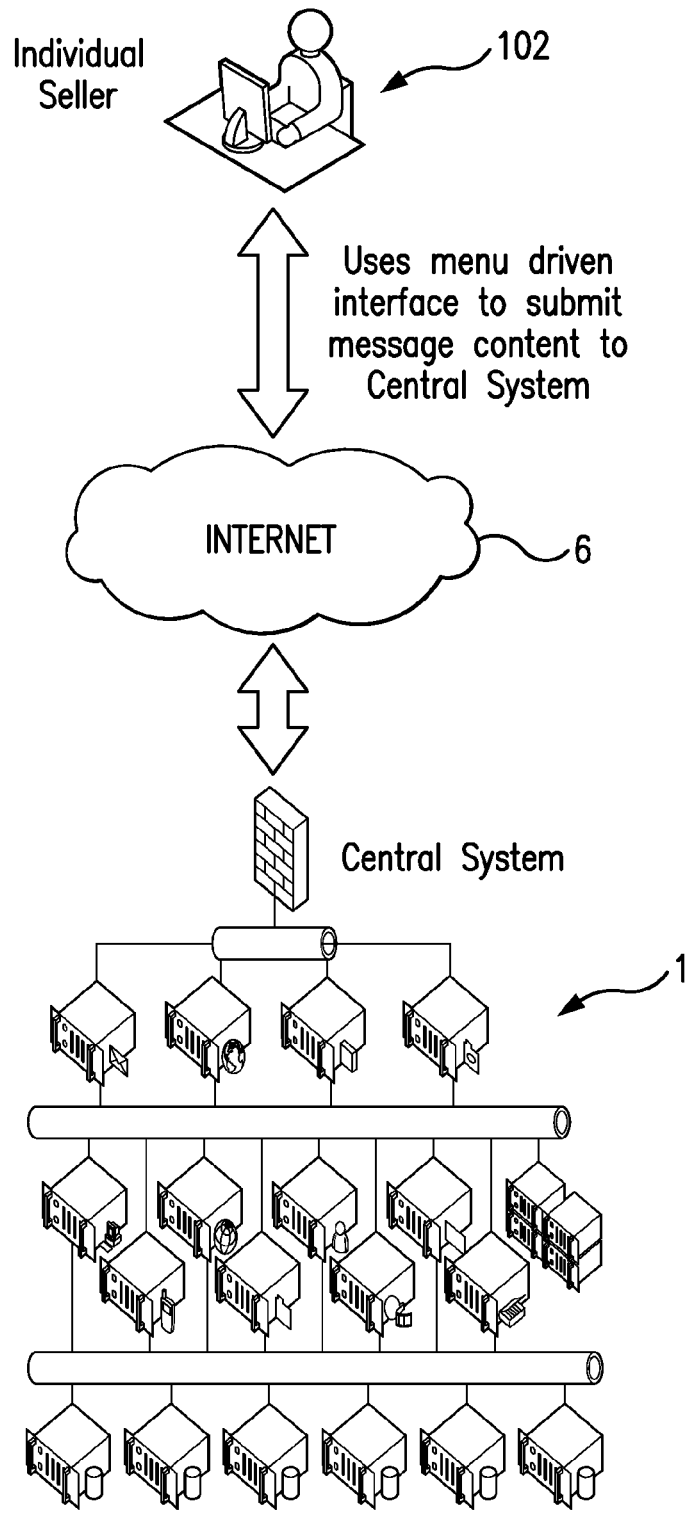
FIG. 14 depicts the publisher work flow use case 3.

FIG. 14 depicts the publisher 4 workflow use case of a typical individual seller 102. The individual seller 102 logs into their account managed by the E-commerce servers 27 on the central system 1. The E-commerce servers 27 will track the parameters entered by the individual seller 102 in order to generate the invoices for the services requested of the central system 1.

At this stage the individual seller 102 can proceed with one or more approaches to generate the advertising message content on the central system 1.

Individual sellers 102 utilizes advertising message content creation, updating and deletion tools provided by the application servers 28 across a Web interface via the Web servers 21 of the central system 1. The Web interface allows for image data, streaming audio and streaming video content for the advertising message content to be uploaded via the FTP servers 22 to the central system 1.

Individual sellers 102 can outsource the advertising message content to be created, updated and deleted to a third party software development company.

For each advertising message content developed or updated, the publisher 4 then selects the time and date schedule and where advertising message content will be delivered and on what types of dynamic display devices are used. The geospatial servers provide the publisher with a graphical interface with maps, features and landmarks where stationary dynamic display devices 11, 13, 42, 45, 46 are located. This graphic interface also allows publishers to create circular or polygon geospatial location areas for the mobile dynamic display devices 14, 35, 36, 37, 39, 40, 41 to display message content. The application servers 28 get the information from the directory servers 32 on the attributes for each type of dynamic display devices 15, 11, 13, 14, 35, 38, 41, 43, 42, 45, 46, 94 selected by the publisher 4 and converts the message content graphics Table 3, message audio Table 2 and message content video Table 1. The application servers also convert the message content markup language Table 4 that is supported by each type dynamic display device selected 15, 11, 13, 14, 35, 38, 41, 43, 42, 45, 46, 94. The schedules, geospatial location rules and message content files for each stationary and mobile dynamic display device 11, 13, 42, 45, 46, 14, 35, 36, 37, 39, 40, 41 are updated and placed on the file servers 30 to be delivered to each dynamic display device 11, 13, 14, 35, 36, 37, 39, 40, 41, 43, 42, 45, 46 selected by the publisher 4. The schedules and geospatial location rules form the business logic to be executed by the processor 52 in the stationary and mobile dynamic display devices 11, 13, 14, 35, 38, 41, 43, 42, 45, 46.

Subscriber 2 portable wireless display devices 15 and 94 are not delivered advertising message content until the schedule, geospatial location constraints and type of information requested criteria entered by the subscriber 2 are met.

Subscriber 2 requests are made available to publishers 4 of products and services by the central system 1 in order to provide information to publishers 4 about subscriber 2 demand for products and services.

Publishers 4 may also send coupons in the form of bar codes that allow subscribers 2 to have their portable wireless display device display scanned by the bar code reader at the point of sale for the publisher 4. This further permits the publisher 4 to track and monitor the success of the location based messaging campaign, reduces the amount of paper coupons retained by the subscriber 2 relieves the point of sale from processing paper coupons back to the publisher 4 for coupon reimbursement.

Figure 15:
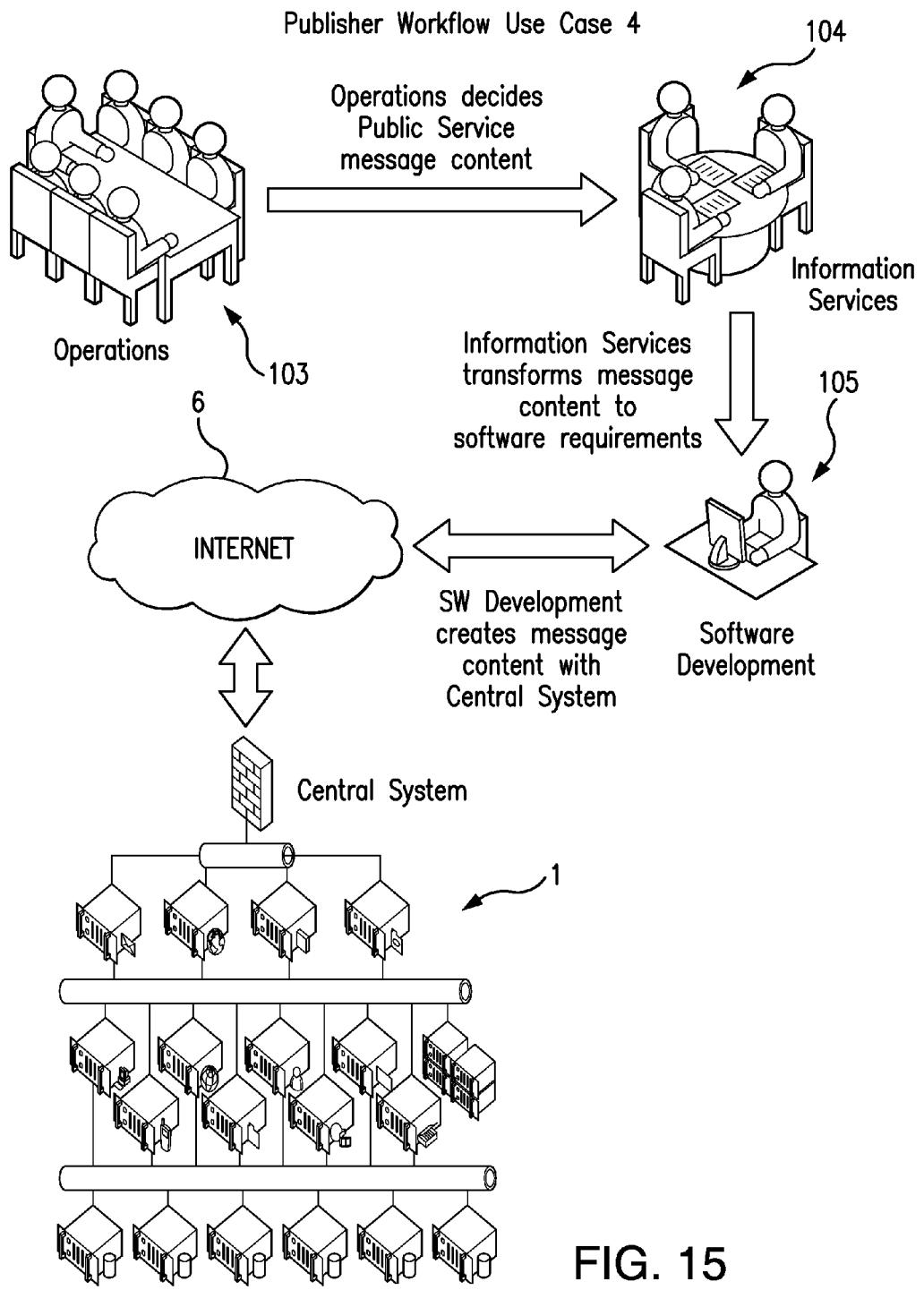
FIG. 15 depicts the publisher work flow use case 4.

FIG. 15 depicts the publisher 5 workflow use case of a typical public entity. Operations 103 creates the public service message content requirements. The public service message content requirements are provided to information services 104 who translates them into public service message content software requirements and provided to software development 105. The developers log into their accounts managed by the E-commerce servers 27 on the central system 1. The E-commerce servers 27 will track the parameters entered by the software developers in order to generate the invoices for the services requested of the central system 1.

At this stage software development can proceed with one or more approaches to generate the advertising message content on the central system 1.

Software development 105 utilizes public service message content creation, updating and deletion tools provided by the application servers 28 across a Web interface via the Web servers 21 of the central system 1. The Web interface allows for image data, streaming audio and streaming video content for the advertising message content to be uploaded via the FTP servers 22 to the central system 1.

Software development 105 utilizes in house software development tools for creating public service message content. Once the advertising message content is created or updated, it is uploaded to the central system 1 using the FTP servers 22.

Software development 105 can direct the application servers 28 to existing public service Web sites and FTP servers to obtain existing public service message content. The central system 1 downloads the public service message content.

Software development 105 can utilize all approaches to obtain a blended solution for public service message content creation, updating and deletion.

For each public service message content developed or updated, the publisher 5 then selects the time and date schedule and where advertising message content will be delivered and on what types of dynamic display devices are used. The application servers 28 get the information from the directory servers 32 on the attributes for each type of dynamic display devices 15, 11, 13, 14, 35, 38, 41, 43, 42, 45, 46, 94 selected by the publisher 5 and converts the message content graphics Table 3, message audio Table 2 and message content video Table 1. The application servers also convert the message content markup language Table 4 that is supported by each type dynamic display device selected 15, 11, 13, 14, 35, 36, 37, 39, 41, 42, 45, 46. The schedules, geospatial location rules and message content files for each stationary and mobile dynamic display device 11, 13, 42, 45, 46, 14, 35, 36, 37, 39, 40, 41 are updated and placed on the file servers 30 to be delivered to each dynamic display device 11, 13, 14, 35, 36, 37, 39, 40, 41, 42, 45, 46 selected by the publisher 5. The schedules and geospatial location rules form the business logic to be executed by the processor 52 in the stationary and mobile dynamic display devices 11, 13, 42, 45, 46, 14, 35, 36, 37, 39, 40, 41.

The current geospatial location of recipients 10 portable wireless display devices is provided to the central system 1 by the wireless networks 7 and 8.

The E-commerce servers 27 allow publishers 3 to specify the geospatial locations where their advertising or public service message content will be displayed. Publishers 3 can also specify the types of stationary or mobile dynamic display devices 11, 13, 42, 45, 46, 14, 35, 36, 37, 39, 40, 41 to display their message content. Publishers 3 can specify a schedule and duration for the message content. Publishers 3 can select for directions to be displayed to their geospatial location from the current geospatial location of the stationary or mobile dynamic display device 11, 13, 42, 45, 46, 14, 35, 36, 37, 39, 40, 41. Publishers 4 can select to display discount coupon codes unique for each stationary or mobile dynamic display device 11, 13, 42, 45, 46, 14, 35, 36, 37, 39, 40, 41 to track the effectiveness of different types of stationary or mobile dynamic display devices 11, 13, 42, 45, 46, 14, 35, 36, 37, 39, 40, 41.

The following examples are disclosed:

A restaurant wants to display luncheon specials on all dynamic display devices 14, 35, 37, 39, 40, 41 that are within 1 mile of the restaurant on weekdays between 11 AM and 1 PM at a frequency of once every three minutes for a duration of 30 seconds. The options are selected to offer a discount coupon code that will identify the mobile dynamic display device 14, 35, 36, 37, 39, 40, 41 which attracted the customer and the option to display a map and route from the current geospatial location of the mobile dynamic display device 14, 35, 36, 37, 39, 40, 41 to the restaurant is selected. The E-commerce server 27 provides a statistical estimate for the cost based on previous history of mobile dynamic display devices 14, 35, 36, 37, 39, 40, 41 within one mile of the restaurant.

A business 101 in the city center is looking to hire an employee to be at work during times when the city center is congested. The business 101 wants to hire a person that lives within walking distance in order to always be at work on time. Stationary dynamic display devices 11, 13, 42, 45, 46 within two miles of the business 101 are selected to place a help wanted advertisement between the hours of 7 AM and 6 PM weekdays every 5 minutes for a duration of 15 seconds with the option to display a map and a route from the geospatial location of the stationary dynamic display 11, 13, 42, 45, 46 to the business 101. The E-commerce server 27 calculates the cost based on a known number of stationary dynamic display devices 11, 13, 42, 45, 46 within two miles of the business 101.

An individual seller 102 is having a garage sale. The individual seller 102 wants to advertise the garage sale for one weekend from 7 AM to 6 PM to all subscribers 2 that have subscribed to garage sales that are within 5 miles of the geospatial location of the garage sale. The E-commerce server 27 provides a cost based on a statistical estimate of garage sale subscribers that have historically been within 5 miles of the geospatial location of the garage sale on a weekend.

A hurricane is one day away and a manufacturer of portable electric generators wants to notify potential customers where they can find portable electric generators in their area. The manufacturer selects all subscribers 2 that have subscribed to hurricane supplies and portable electric generators. The manufacturer selects the navigation option for subscribers 2 to locate the retail geospatial location closest to them that has inventory and a phone number of the retail geospatial location to reserve a portable electric generator. Since many people will be shopping for hurricane supplies the manufacturer selects a stationary and mobile dynamic display devices 11, 13, 42, 45, 46, 14, 35, 36, 37, 39, 40, 41 in the affected area for the next 24 hours to display message content every 15 minutes for a duration of 1 minute with the option to display a map and route from the current geospatial location of the stationary or mobile dynamic display device 11, 13, 42, 45, 46, 14, 35, 36, 37, 39, 40, 41 to the retail geospatial location with inventory and a phone number for that retail geospatial location to reserve a portable electric generator. The E-commerce server 27 calculates the cost based on the number of stationary and mobile dynamic display devices 11, 13, 42, 45, 46, 14, 35, 36, 37, 39, 40, 41 used as well as the subscribers 2 used.

A kidnapping has occurred and law enforcement has a description of the vehicle. The law enforcement agency selects to send a public service message with the description of the criminal, victim and car along with images of the make/model car and the victim to all recipients' 10 portable dynamic display devices 15 in the search area. In addition the law enforcement agency selects all stationary and mobile dynamic display devices 11, 13, 42, 45, 46, 14, 35, 36, 37, 39, 40, 41 in the search area.

The above examples are not meant to disclose all possibilities, rather demonstrate the usage of the end to end system for different types of publishers 3 delivering specific message content of subscription or value based on the geospatial location of the recipients 10 and subscribers 2 with a schedule and options.

Figure 16:
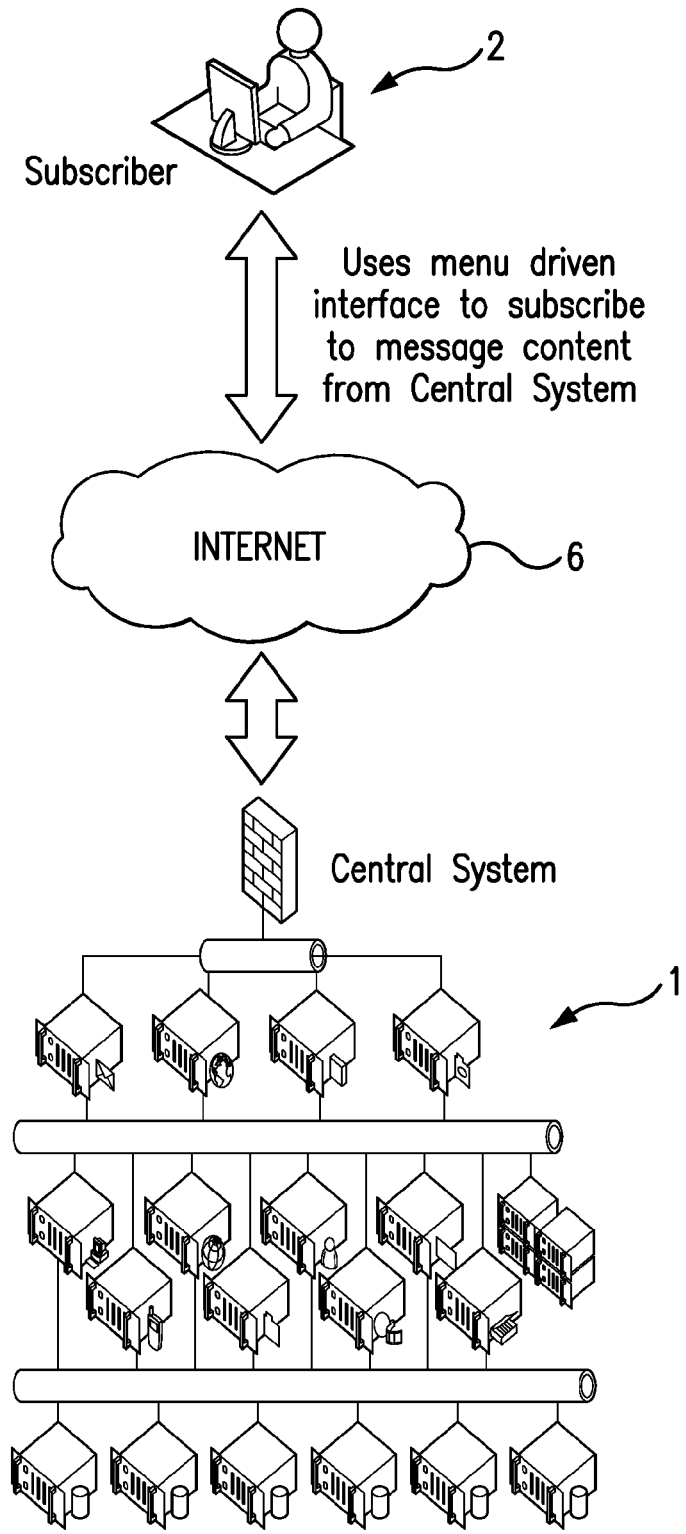
FIG. 16 depicts the subscriber work flow.

FIG. 16 depicts the subscriber 2 workflow use case of a typical subscriber 2. The subscriber 2 creates or logs into their account managed by the E-commerce servers 27 on the central system 1. The E-commerce servers 27 will track the parameters entered by the subscriber 102 in order to generate any coupons or rewards for the services requested of the central system 1. Note the subscriber can establish an account and enter parameters either on a desktop, laptop or a portable wireless display device 15 that provides support for Web sites.

At this stage the subscriber 2 can proceed with subscribing to product and service notifications when the subscriber 2 is within a specified distance from where the product or service can be obtained.

Upon the subscriber 2 entering their wireless number for their portable wireless display device 15, the central system requests the type of portable wireless display device from the wireless network 7 and 8. If the type of device cannot be provided the central system 1 requests information about the subscriber's 2 portable wireless display device 15 so that the application servers 28 can correctly convert the publisher's 3 message content.

Once the type of subscriber 2 portable wireless display device is known the subscriber can allow portable wireless display device 15 resident applications to be downloaded from the central system 1 to the subscriber's 2 portable wireless display device 15. Resident applications can be mandatory and optional. Such applications would perform the following functions and services:

Stream UDP (User Datagram Protocol) messages as known in the art from the subscriber's 2 portable wireless display device to the gateway servers 106 of the central system 1. UDP messages are connectionless, highly affordable, fast delivery and cost effective IP (Internet Protocol) messages that do not burden the wireless network 7 and 8 with assured delivery, ordered delivery and flow control. This would be a mandatory resident application in order to locate the subscriber's 2 portable wireless display device 15. These messages contain the following information:

Unique packet sequence number for ACK/NACK packet protocol

Unique identification number of the portable wireless display device.

Current geospatial location of the portable wireless display device.

Datestamp and timestamp.

Downloading navigation, either directions or the geospatial location of the destination, to allow the central system 1 to download navigation directions to the subscriber's 2 portable wireless display device 15. This would be an optional feature and could be an application or data for an already resident navigation application.

Using Bluetooth, WiMax and 802.11 (WLAN) to locate a subscriber's 2 portable wireless display device 15 within visual range of stationary or mobile dynamic display devices 11, 13, 42, 45, 46, 14, 35, 36, 37, 39, 40, 41. This would be an optional feature.

Audio, image and video capture and transmission capability for subscriber's 2 portable wireless display devices 15 to support feedback to publishers 3 related to message content observation. This would be an optional feature.

Sending a coded message to the central system 1 to obtain discounts for products, services or retailers. This would be an optional feature.

Live text chat, as is known in the art and voice communications can be invoked by the subscriber 2 with the publisher 3.

Subscriber 2 portable wireless display devices 15 and 94 are not delivered advertising message content until the schedule, geospatial location constraints and type of information requested criteria entered by the subscriber 2 are met.

FIG. 10 depicts a head mounted portable wireless dynamic display device. Heads up displays, as known in the art, have been used by military pilots to free their hands for flying tasks in helicopters and fighter aircraft where the crew size is limited and must perform multiple tasks. Heads up windshield displays have been in us automobiles for a decade to allow the driver to look straight ahead rather than glance down at the instrument cluster. With the growing controversies and even legislation regulating operation of portable wireless display devices 15, head mounted portable wireless display devices 15 may be the logical answer for hands free operation. These devices can be true multimedia with headphones 96, heads up display 95, microphone 94 and camera 50 provide total hands free operation when combined with voice recognition commands as known in the art. When audio, image and video recognition is incorporated and integrated with the central system 1, publishers 3, for the first time, can know when recipients 10 and subscribers 2 are viewing or hearing message content and for how long. The application servers 28 receive an image or video taken by the camera 97 from an application downloaded by the directory server 32 to the head mounted portable wireless display device depicted in FIG. 10 via the gateway servers 106. The application servers 28 perform image recognition as is known in the art and log the date, time, id of the head mounted portable wireless display device depicted in FIG. 10, id of the stationary or mobile dynamic display device 11, 13, 42, 45, 46, 14, 35, 36, 37, 39, 40, 41 and the geospatial location to the E-commerce servers 27 for subsequent reporting to the publishers 3.

For non head mounted portable wireless display devices 15, the subscriber could be requested by the publisher message content to capture an image or video using the camera on the subscriber's portable wireless display device. Optionally, the geospatial location of the recipient 15 or subscriber 2 can be determined to be within visual distance of the stationary or mobile dynamic display device 11, 13, 42, 45, 46, 14, 35, 36, 37, 39, 40, 41 by the following means:

GPS with differential corrections being provided by the central system 1 can locate the recipient 10 or subscriber 2 within centimeter accuracy provided that the portable wireless display device 15 has an integrated GPS receiver. Locating recipients 10 would also rely on the wireless network 7, 8 reporting the geospatial location of the recipient's 10 portable wireless display device 15 to the central system 1.

Dead reckoning provided that the portable wireless display device 15 has an integrated INS.

Indoor GPS repeaters with differential corrections can locate the recipient 10 or subscriber 2 within centimeter accuracy provided that the portable wireless display device 15 has an integrated GPS receiver.

Bluetooth, being very short range, could also be made directional with the proper antennas locating the subscriber 2 in front of the stationary or mobile dynamic display device 11, 13, 42, 45, 46, 14, 35, 36, 37, 39, 40, 41 with a resident application sending the subscriber's 2 id for the portable wireless display device 15.

WiMax technology can locate WiMax devices within a few feet provided that the portable wireless display device 15 has an integrated WiMax transceiver.

Radar responsive tag technology can locate to sub meter accuracy with antennas placed indoors within a facility or placed outdoors on towers or buildings.

Subscribers 2 and recipients 10 could be prompted by the stationary or mobile dynamic display device 11, 13, 42, 45, 46, 14, 35, 36, 37, 39, 40, 41 to send a code in a text message to the central system 1 to obtain a discount for a product, service or store geospatial location.

Subscribers 2 and recipients 10 could be prompted by the central system 1 to take a picture of the message content for image recognition.

All of these methods disclosed are to provide publishers with feedback as to the effectiveness of their selection of stationary and mobile dynamic display devices 11, 13, 42, 45, 46, 14, 35, 36, 37, 39, 40, 41.

Figure 17A:
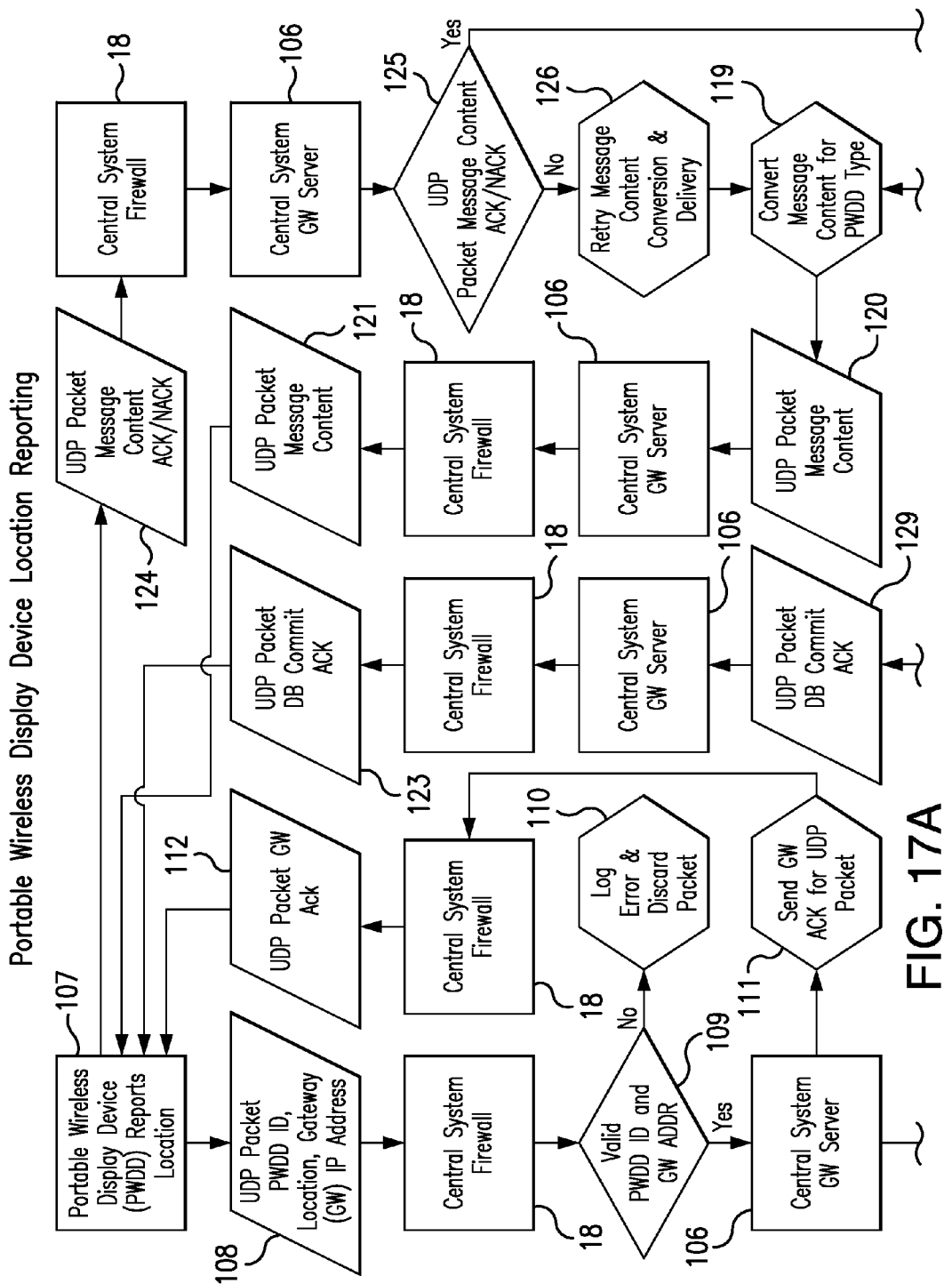
FIG. 17 depicts the geospatial location reporting data flow from the subscriber portable wireless display device
Figure 17B:
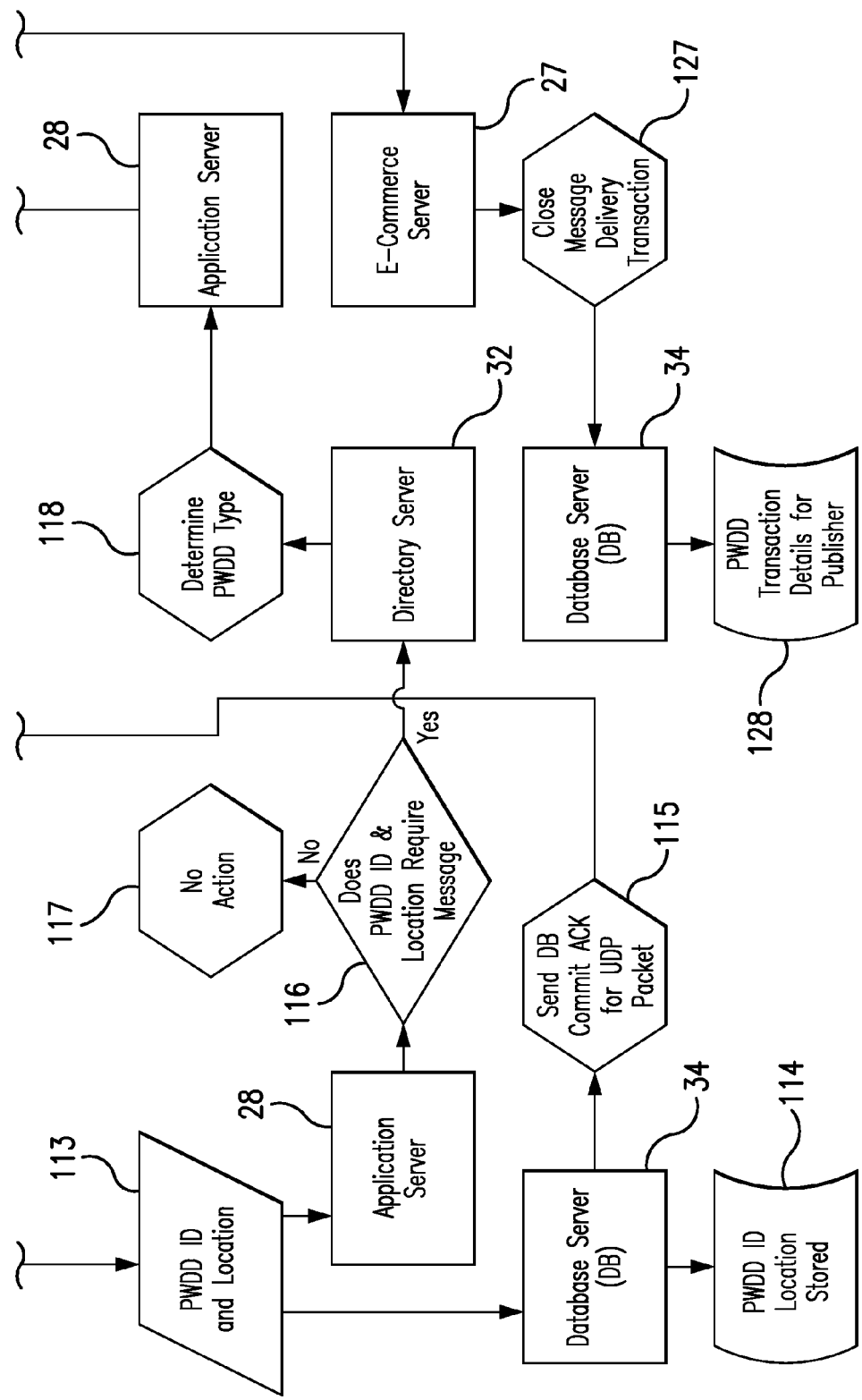

FIG. 17 discloses the critical geospatial location reporting end to end data flow for the portable wireless display device 15. This is the most real time critical data flow because the portable wireless display device's 15 geospatial location is changing so the message content must be delivered in a timely manner. The other factor is that with millions of portable wireless display devices 15 reporting simultaneously the architecture of the central system 1 must be highly efficient.

This invention discloses a highly efficient method to process millions of portable wireless display device's 15 reporting simultaneously.

The portable wireless display device 15 has an resident application that continuously runs in the background which collects the current geospatial location from either the integrated GPS, the integrated INS, cellular tower based triangulation computed on the portable wireless display device 15, Cellular TDOA computed on the portable wireless display device 15, or receiving its geospatial location from a stationary or mobile dynamic display device 11, 13, 42, 45, 46, 14, 35, 36, 37, 39, 40, 41 via integrated Bluetooth, 802.11 WLAN or WiMax.

The resident application initially downloaded from the central server 1 when the subscriber 2 registered their portable wireless display device 15 executes in the background collecting geospatial location data (latitude and longitude) at a programmable interval set by command and control parameter messages received from the central system 1. The portable wireless display device 15 reports its geospatial location 107 using a User Datagram Protocol (UDP) message 108. UDP packets are very fast because they use a connectionless Internet protocol. Connectionless, as known in the art, requires no connection to be set up and disconnected by the wireless network 7, 8 reducing computation on the wireless networks 7, 8 as well as the source (sender) and destination (receiver) of the UDP data packet(s). Connectionless UDP data packet(s) also have no delivery confirmation, therefore the network processing time and costs associated with wireless network 7, 8 transport layer delivery services, as known in the art, are not incurred. If the route of the UDP packet(s) uses highly reliable networks then few UDP packet(s) will be lost. Since the end to end system relies on wireless networks 7, 8 the end to end reliability of the network is degraded. To assure that portable wireless display devices 15 can report their geospatial location and assure that message content can be delivered, the end to end system must implement assured delivery.

The UDP packet(s) are sent to the central system 1 firewall 18 with a destination IP address for a gateway server 106. The firewall validates the gateway server 106 IP address 109 and the portable wireless display device 15 unique ID number and if either are not valid, discards the UDP packet 110. The gateway server 106 sends a gateway ACK (acknowledgement) UDP packet 111 for the unique UDP packet sequence number to the central system 1 firewall 18 with the destination IP address of the portable wireless display device 15. This ACK UDP packet 112 resets the UDP packet sequence number timer in the resident application in the portable wireless display device 15 so that the UDP packet is not sent again due to failure of being delivered to the central system 1 gateway server 106. Should the portable wireless display device 15 not receive a gateway ACK UDP packet then after a period of time the portable wireless display device 15 will retransmit the UDP packet 110 to a different gateway server 106. This prevents UDP data packets from being lost due to a degraded wireless link or a gateway server 106 failure. UDP packets contain a unique packet sequence number, as is known it the art, to keep track of message packets that have been acknowledged, not acknowledged or negatively acknowledged.

The gateway server then parses the data 113 from the UDP packet 108 and spans two services; (1) to send the data to the data base server 34 and (2) to send the data to the application server 28.

The data base server 34 commits the data to the portable wireless display device geospatial location data base 114 and constructs 115 a data base commit ACK UDP packet 129 to be sent to the portable wireless display device 15 resident application. The UDP data packet 123 resets the second timer for the unique UDP packet sequence number in the resident application in the portable wireless display device 15 so that the UDP packet is not sent again due to failure of being committed to the geospatial location data base 114. This end to end acknowledgement implements assured delivery of portable wireless display device 15 geospatial location data. This method commits geospatial location data to the geospatial location data base 114 and spawns the message content delivery 116 by the fastest means possible. Additionally, the end to end system architecture assures that no data is lost.

The application server 28 must determine if the portable wireless display device 15, based on it's current geospatial location and subscription rules, if message content delivery is required 116. If the geospatial location and subscription rules are not met, no further action is required 117 and the transaction is complete. Should the geospatial location and schedule rules be met, a service is started on the directory server 32 to determine the type of portable wireless display device 15. This type definition 118 is passed as parameters when a service is started on the application server 28 to (1) convert the message content 119 to comply with the image, audio and video formats and markup language supported by the portable wireless display device 15 and (2) construct a UDP packet(s) to contain the message content 120. The message content UDP packet(s) 121 is sent to the portable wireless display device 15.

Upon successful reception of the message content UDP packet(s) 121 the portable wireless display device 15 transmits a message content ACK/NACK (Negative ACK) packet 124. If the UDP ACK/NACK packet does not arrive within a time limit, the message content UDP packet(s) will be sent again by the application server 28. If the message content ACK/NACK UDP packet 124 contains a NACK 125 then the message delivery will be retried 126 by reconstructing the message content 119 since a NACK indicates the message content UDP message packets 121 were receiver but there was an error. If the message content ACK/NACK UDP packet 124 contains an ACK 125 then a service is started on the E-commerce server 27 to close the message content delivery transaction and perform accounting for the publisher 3. A service will then be started on the data base server 34 to commit the transaction information to the message content delivery database 128.

The data flow for the mobile dynamic display devices 14, 35, 36, 37, 39, 40, 41 is similar. One exception is that whenever the display schedule and message content is updated by the central system 1 as a result if publishers 3 creating, editing or deleting message content, the message content delivered to the mobile dynamic display devices 14, 35, 36, 37, 39, 40, 41 contains the updated schedule rules and message content.

The data flow for the stationary dynamic display devices 11, 13, 42, 45, 46 is similar to the mobile dynamic display devices 14, 35, 36, 37, 39, 40, 41. One difference is that the stationary dynamic display device 14, 35, 36, 37, 39, 40, 41 does not report geospatial location since it does not move.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed:

1. A system for delivering message content, the system comprising:
   a plurality of publishers, a plurality of mobile dynamic display devices, a plurality of stationary dynamic display devices, a plurality of subscriber devices, and a plurality of non-subscriber devices;
   wherein the plurality of publishers use a plurality of input devices and a plurality of servers to generate and distribute a distribution message, as well as receive a return message based on a pre-determined set of rules for each of the plurality of servers, the plurality of mobile dynamic display devices, the plurality of stationary dynamic display devices, the plurality of subscriber devices, and the plurality of non-subscriber devices;
   wherein the pre-determined set of rules is based, at least in part, on location information of the plurality of subscriber devices and the plurality of non-subscriber devices;
   wherein the plurality of publishers are registered with the plurality of servers to create the distribution message and the rules for sending the distribution message, as well as the return message and the rules for sending the return message;
   wherein the distribution message, the return message and the set of publisher and subscriber rules being transformed and stored on the system permanent storage;
   wherein the plurality of subscribers are registered with the plurality of servers to create the rules for receiving the distribution message;
   wherein the plurality of mobile and stationary dynamic display devices are registered with the plurality of servers to receive the distribution message and transmit the return message;
   wherein the plurality of subscriber devices are registered with the plurality of servers to receive the distribution message and transmit the return message;
   wherein the plurality of non-subscriber devices are not registered with the plurality of servers;
   wherein the distribution message is transmitted based on the pre-determined set of rules;
   wherein the return message is transmitted based on the pre-determined set of rules;
   wherein the plurality of subscriber and non-subscriber devices includes:
   hand held devices and
   head mounted eyewear, capable of transmitting the return message, comprising: an audio recording component, a lens component, a video image capturing component capable of capturing the content the user is currently viewing, a heads up display unit capable of providing the subscriber or non-subscriber with visual content of the distribution message without requiring the user to look away from their normal viewpoint, and a transmission component capable of transmitting the return message;
   wherein the distribution message is transmitted based on the pre-determined rules for the plurality of mobile and stationary dynamic display devices, the plurality of subscriber devices, the plurality of non-subscriber devices, and the plurality of servers;
   wherein the return message is received based on the pre-determined set of rules;
   wherein the distribution message is comprised of graphics, text, image, video and audio content;
   wherein the return message is comprised of graphics, text, image, video and audio content;
   wherein the return message is used by the plurality of publishers to determine the location information of the subscriber, the audio, image, video, and voice content from the subscriber in real time, and whether the publisher's own content was viewed by the subscriber;
   wherein the publisher uses content from the return message to determine the total number of subscribers and non-subscribers that are viewing the content; and
   wherein the publishers dynamically update content to send in further distribution messages to the mobile devices, dynamic display devices, subscriber devices, and non-subscriber devices based on the content and statistics generated in the return message.

2. The system of claim 1, wherein the plurality of servers use a Service Oriented Architecture.

3. The system of claim 1, wherein the plurality of servers are centralized or distributed.

4. The system of claim 1, wherein the pre-determined set of rules for the publisher or subscriber devices further comprises: geospatial location information from at least one of the following: Global Positioning Service (GPS) information, Time Difference Of Arrival (TDOA) information, azimuth and range information, wireless signal strength triangulation, and Inertial Navigation System (INS) information.

5. The system of claim 1, wherein the pro-determined set of rules for the publisher or subscriber devices further comprises a geospatial area defined by a geometric shape.

6. The system of claim 1, wherein the pre-determined set of rules for the publisher or subscriber devices further comprises time of day.

7. The system of claim 1, wherein the pre-determined set of rules for the publisher or subscriber devices further comprises a time interval per day.

8. The system of claim 1, wherein the pre-determined set of rules for the publisher devices further comprises a message time duration.

9. The system of claim 1, wherein the pre-determined set of rules for the publisher devices further comprises number of times per day.

10. The system of claim 1, wherein the pre-determined set of rules for the publisher or subscriber devices further comprises a day of week.

11. The system of claim 1, wherein the pre-determined set of rules for the publisher or subscriber devices further comprises a date range.

12. The system of claim 1, wherein the pre-determined set of rules for the publisher devices further comprises number of times per week.

13. The system of claim 1, wherein the pre-determined set of rules for the publisher or subscriber devices further comprises a day of month.

14. The system of claim 1, wherein the pre-determined set of rules for the publisher devices further comprises number of times per month.

15. The system of claim 1, wherein the pre-determined set of rules for the publisher devices further comprises a day of year.

16. The system of claim 1, wherein the pre-determined set of rules for the publisher devices further comprises number of times per year.

17. The system of claim 1, wherein the pre-determined set of rules for the subscriber devices further comprises the type of distribution message.

18. The system of claim 1, wherein the pre-determined set of rules for the subscriber devices further comprises the type of product or service.

19. The system of claim 1, wherein the pre-determined set of rules for the subscriber devices further comprises product manufacturers.

20. The system of claim 1, wherein the pre-determined set of rules for the subscriber devices further comprises service providers.

21. The system of claim 1, wherein the pre-determined set of rules for the subscriber devices further comprises price range.

22. The system of claim 1, wherein the pre-determined set of rules for the subscriber devices further comprises the discount range.

23. The system of claim 1, wherein the pre-determined set of rules for the subscriber devices further comprises coupon delivery.

24. The system of claim 1, wherein the pre-determined set of rules for the subscriber devices further comprises retail stores.

25. The system of claim 1, wherein the pre-determined set of rules for the subscriber devices further comprises online merchants.

26. The method of claim 1, wherein the pre-determined set of rules for the subscriber devices further comprises the type of product or service.

27. The system of claim 1, wherein the pre-determined set of rules for the subscriber devices further comprises subscriber response to advertisements, discounts, and coupons.

28. The system of claim 1, wherein the pre-determined set of rules for the subscriber devices further comprises subscriber interests for products and services.

29. The system of claim 1, wherein the subscribers communicate with publishers in real time using chat, text messaging, voice, graphics, photos and video.

30. The system of claim 1, wherein the publisher displays navigation instructions from the location of mobile or stationary dynamic display device to the location of the publisher's product or service.

31. The system of claim 1, wherein the publisher displays navigation instructions from the location of a subscribers or non subscriber's device to the location of the publisher's product or service.

32. The system of claim 1, wherein the publisher receives point of sale confirmation for the publisher's distribution message for a product or service.

33. The system of claim 1, wherein the publisher receives a report whenever a subscriber views or hears the publisher's distribution message.

34. The system of claim 1, wherein the publisher receives notification whenever a subscriber is within viewing or audible range of the publisher's distribution message.

35. The system of claim 1, wherein the publisher requests subscribers to capture audio, image text or video content from mobile or stationary dynamic display device.

36. The system of claim 1, wherein subscribers and non subscribers can send a query to publishers related to a distribution message sent to a mobile or stationary dynamic display device.

37. The system of claim 1, wherein the system transforms the distribution message format based on the device.

38. The system of claim 1, wherein the distribution message and the return message use a User Datagram Protocol (UDP).

39. The system of claim 1, wherein the plurality of servers process the return message in order to generate metrics based on subscriber and non-subscriber usage of the distribution message.

40. The system of claim 1, wherein the distribution message is transformed to the formats that the subscriber's or non subscriber's device supports.

41. The system of claim 1, wherein the distribution message is transformed to the formats that the mobile or stationary dynamic display device supports.

42. A method for delivering message content, the method comprising:
generating, by a plurality of publishers using a plurality of input devices and a plurality of servers, a distribution message based on a pre-determined set of rules for each of the plurality of servers, a plurality of mobile and stationary dynamic display devices, a plurality of subscriber devices, and a plurality of non-subscriber devices;
wherein the pre-determined set of rules is based, at least in part, on location information of the plurality of subscriber devices and the plurality of non-subscriber devices;
wherein the plurality of publishers are registered with the plurality of servers to create the distribution message and the rules for sending the distribution message, as well as the return message and the rules for sending the return message;
wherein the plurality subscribers are registered with the plurality of servers to create the rules for receiving the distribution message;
wherein the distribution message, the return message, and the set of publisher and subscriber rules are transformed and stored on the system permanent storage;
wherein the plurality of mobile and stationary dynamic display devices are registered with the plurality of servers to receive the distribution message and transmit the return message;
wherein the plurality of subscriber devices are registered with the plurality of servers to receive the distribution message and transmit the return message;
wherein the plurality of non-subscriber devices are not registered with the plurality of servers;
wherein the plurality of subscriber devices and non-subscriber devices includes:
hand held devices and
head mounted eyewear, capable of transmitting the return message, comprising: an audio recording component, a lens component, a video image capturing component capable of capturing the content the user is currently viewing, a heads up display unit capable of providing the subscriber or non-subscriber with visual content of the distribution message without requiring the user to look away from their normal viewpoint, and a transmission component capable of transmitting the return message;
wherein the distribution message is transmitted based on the pre-determined set of rules;
transmitting the distribution message based on the pre-determined set of rules;
receiving the return message based on the pre-determined set of rules;
wherein the distribution message is comprised of graphics, text, image, video and audio content;
wherein the return message is comprised of graphics, text, image, video and audio content;
wherein the return message is used by the plurality of publishers to determine the location information of the subscriber, the audio, image, video, and voice content from the subscriber in real time, and whether the publisher's own content was viewed by the subscriber;

wherein the publisher uses content from the return message to determine the total number of subscribers and non-subscribers that are viewing the content; and wherein the publishers dynamically update content to send in further distribution messages to the mobile devices, dynamic display devices, subscriber devices, and non-subscriber devices based on the content and statistics generated in the return message.

43. The method of claim 42, wherein the plurality of servers use a Service Oriented Architecture.

44. The method of claim 42, wherein the plurality of servers are centralized or distributed.

45. The method of claim 42, wherein the pre-determined set of rules for the publisher or subscriber devices further comprises location information from at least one of the following: Global Positioning Service (GPS) information, Time Difference Of Arrival (TDOA) information, azimuth and range information, wireless network signal strength triangulation, and Inertial Navigation System (INS) information.

46. The method of claim 42, wherein the pre-determined set of rules for the publisher or subscriber devices further comprises a geospatial area defined by a geometric shape.

47. The method of claim 42, wherein the pre-determined set of rules for the publisher or subscriber devices further comprises time of day.

48. The method of claim 42, wherein the pre-determined set of rules for the publisher or subscriber devices further comprises a time interval per day.

49. The method of claim 42, wherein the pre-determined set of rules for the publisher devices further comprises a message time duration.

50. The method of claim 42, wherein the pre-determined set of rules for the publisher devices further comprises number of times per day.

51. The method of claim 42, wherein the pre-determined set of rules for the publisher or subscriber devices further comprises a day of week.

52. The method of claim 42, wherein the pre-determined set of rules for the publisher or subscriber devices further comprises a date range.

53. The method of claim 42, wherein the pre-determined set of rules for the publisher devices further comprises number of times per week.

54. The method of claim 42, wherein the pre-determined set of rules for the publisher or subscriber devices further comprises a day of month.

55. The method of claim 42, wherein the pre-determined set of rules for the publisher devices further comprises number of times per month.

56. The method of claim 42, wherein the pre-determined set of rules for the publisher devices further comprises a day of year.

57. The method of claim 42, wherein the pre-determined set of rules for the publisher devices further comprises number of times per year.

58. The method of claim 42, wherein the pre-determined set of rules for the subscriber devices further comprises the type of distribution message.

59. The method of claim 42, wherein the pre-determined set of rules for the subscriber devices further comprises the type of product or service.

60. The method of claim 42, wherein the pre-determined set of rules for the subscriber devices further comprises product manufacturers.

61. The method of claim 42, wherein the pre-determined set of rules for the subscriber devices further comprises service providers.

62. The method of claim 42, wherein the pre-determined set of rules for the subscriber devices further comprises price range.

63. The method of claim 42, wherein the pre-determined set of rules for the subscriber devices further comprises: the discount range.

64. The method of claim 42, wherein the pre-determined set of rules for the subscriber devices further comprises: coupon delivery.

65. The method of claim 42, wherein the pre-determined set of rules for the subscriber devices further comprises: retail stores.

66. The method of claim 42, wherein the pre-determined set of rules for the subscriber devices further comprises: online merchants.

67. The method of claim 42, wherein the pre-determined set of rules for the subscriber devices further comprises: the type of product or service.

68. The method of claim 42, wherein the pre-determined set of rules for the subscriber devices further comprises: subscriber response to advertisements, discounts and coupons.

69. The method of claim 42, wherein the pre-determined set of rules for the subscriber devices further comprises subscriber interests for product and service.

70. The method of claim 42, wherein the subscriber communicates with publishers in real time using chat, text messaging, voice, graphics, photos and video.

71. The method of claim 42, wherein the publisher can display navigation instructions from the location of mobile or stationary dynamic display device to the location of the publisher's product or service.

72. The method of claim 42, wherein the publisher displays navigation instructions from the location of a subscriber's or non subscriber's device to the location of the publisher's product or service.

73. The method of claim 42, wherein the publisher receives point of sale confirmation for the publisher's distribution message for a product or service.

74. The method of claim 42, wherein the publisher receives a report whenever a subscriber views or hears the publisher's distribution message.

75. The method of claim 42, wherein the publisher receives notification whenever a subscriber is within viewing or audible range of the publisher's distribution message.

76. The method of claim 42, wherein the publisher requests subscribers to capture audio, image text or video content from mobile or stationary dynamic display device.

77. The method of claim 42, wherein subscribers and non subscribers send a query to publishers related to a distribution message sent to a mobile or stationary dynamic display device.

78. The method of claim 42, wherein the system transforms the distribution message format based on the device.

79. The method of claim 42, wherein the distribution message and the return message use a User Datagram Protocol (UDP).

80. The method of claim 42, wherein the plurality of servers process the return message in order to generate metrics based on subscriber and non-subscriber usage of the distribution message.

81. The method of claim 42, wherein the distribution message is transformed to the formats that the subscriber's or non subscriber's device supports.

82. The method of claim 42, wherein the distribution message is transformed to the formats that the dynamic display device supports.

* * * * *